US006473738B1

United States Patent
Garrett

(12) United States Patent
(10) Patent No.: US 6,473,738 B1
(45) Date of Patent: Oct. 29, 2002

(54) MULTIPLE-PERSON BUYING INFORMATION SYSTEM WITH APPLICATION TO ON-LINE MERCHANDIZING

(76) Inventor: James Gordon Garrett, 66 Glenwood Dr., Greenwich, Fairfield County, CT (US) 06830

( * ) Notice: Subject to any disclaimer, the term of this patent is extended or adjusted under 35 U.S.C. 154(b) by 0 days.

(21) Appl. No.: 09/533,605

(22) Filed: Mar. 23, 2000

(51) Int. Cl.[7] ............................................. G06F 17/60
(52) U.S. Cl. ...................................................... 705/26
(58) Field of Search ..................................... 705/26, 27

(56) References Cited

U.S. PATENT DOCUMENTS

| 5,774,874 A | * | 6/1998 | Veeneman et al. ............. 705/27 |
| 5,970,474 A | * | 10/1999 | LeRoy et al. .................. 705/27 |
| 6,175,823 B1 | * | 1/2001 | Van, Dusen .................. 705/26 |
| 6,249,773 B1 | * | 6/2001 | Allard et al. .................. 705/26 |
| 6,266,649 B1 | * | 7/2001 | Linden et al. ................. 705/26 |
| 6,317,722 B1 | * | 11/2001 | Jacobi et al. .................. 705/14 |
| 2002/0023024 A1 | * | 2/2002 | Kaimowitz ................... 705/26 |

FOREIGN PATENT DOCUMENTS

| JP | 2001167158 A | * | 6/2001 | ........... G06F/17/60 |
| JP | 2001209678 A | * | 8/2001 | ........... G06F/17/60 |

OTHER PUBLICATIONS

GiftCertificates.com web site.*
"Nebraska Company, Giftpoint.com, Creating . . . The Amazon.com of Gift Certificates", May 13, 1999, Business Wire, p. 1386.*
RedEnvelope.com web site.*
"RedEnvelope Gifts Online Launches on Oct. 28 as Premiere Gift–Giving Website", Oct. 28, 1999.*
"Send.com Redefines Gift Giving Online", Nov. 8, 1999, PR Newswire, p. 8972.*
"GiftCertificates.com Announces Merger Agreement with giftpoint.com, To Form Largest Online Marketer of Branded Currencies", Apr. 7, 2000, PR Newswire, p. 6705.*
"Circuit City and Giftpoint.com to Offer Giftcards On–Line; Time–Saving Features Put Ease in Season's Greetings", Nov. 22, 1999, PR Newswire, p. 1329.*

* cited by examiner

Primary Examiner—Robert P. Olszewski
Assistant Examiner—Bryan Jaketic
(74) Attorney, Agent, or Firm—John T. Peoples

(57) ABSTRACT

Techniques for implementing a computer-implemented, multi-party merchandizing service. This service engenders a buying experience that parallels the best aspects of an "in-store" buying experience, but engenders other aspects which can be advantageously provided by a computer system, such as the shopper being able to prepare a list of multiple third parties for whom the shopper desires to purchase selected items. In effect, this list "tags along" with the shopper as the shopper completes an automated search for items to purchase. Then, the shopper can associate a selected item located during the search with individual names on the list, and then initiate an order-fulfillment activity to complete the shopping experience.

10 Claims, 24 Drawing Sheets

MULTIPLE-PERSON BUYING INFORMATION SYSTEM WITH APPLICATION TO ON-LINE MERCHANDIZING

BACKGROUND OF THE DISCLOSURE

1. Field of the Invention

This invention relates to a computer network-implemented service and, more particularly, to a methodology for compiling, managing and saving name lists, along with associated items, compiled by a shopper which thereby engenders a multiple-person buying experience.

2. Description of the Background Art

Automating the "on-line" shopping experience on the Internet should mirror the best aspects of the "in-store" experience and, where possible, even improve upon the in-store experience because of the ability of the Internet to perform computations as well as manage and automatically store databases. Current on-line shopping has not mirrored these best aspects, nor has the shopping experience been particularly user-friendly—for instance, shopping lists being compiled dynamically are oftentimes lost or abandoned in mid-stream without being automatically saved.

Traditionally, customer access to and interaction with on-line merchandisers of products (e.g., books or food items) over the Internet is specific to the individual customer, that is, a customer accesses the merchandiser via a Web site address (e.g., Uniform Resource Locator (URL) "www.amazon.com" for books, and "www.priceline.com" for food) which controls interactions with the Web site only for this customer. As an example, suppose the on-line customer accesses the Web site home page of "amazon.com", a popular book merchandiser (among other items). Once connected to this home page, a registered customer provides general information, such as an e-mail address, and oftentimes security information, such as a personal identification number (PIN), to utilize the services of the Web site in completing purchases. The customer experience while accessing the Web site is personal in nature in the sense that purchases of books available via the Web site are, in the beginning, treated as if intended only for the identified customer, that is, it is not possible at this juncture for the customer to explicitly shop for other, multiple parties.

As alluded to, the "amazon.com" Web site is a well-known Internet site for purchasing books, so differentiating the book purchasing experience using "amazon.com" (which is representative of virtually all known purchasing techniques over the Internet) serves as the point-of-departure for the present inventive subject matter. Thus, to distinguish the principles of operation of the inventive subject matter from "amazon.com", it is elucidating to first discuss in an overview manner high-level aspects of the technique for buying books on the "amazon.com" Web site, especially when purchasing books for other parties as well as the customer (referred to as the shopper below).

With "amazon.com", the visualization mechanism used for on-line purchases is that of filling a "shopping cart" with the books selected as the Web site is perused for books of interest to purchase by the shopper. The books in the shopping cart are all associated with the shopper at the commencement of the shopping experience. Thus, in using this basically-universal virtual "shopping cart" paradigm, the shopper peruses the "amazon.com" Web site searching for and then selecting books of interest to the shopper and/or third parties, whereupon the shopper "deposits" book choices into the shopping cart as the books are selected. However, of particular relevance is the fact that all books are deposited into a single shopping cart without the ability to keep separate book selections intended for different parties, that is, the shopping cart is not "compartmentalized" with compartments being associated with third parties. The shopper is responsible for remembering book selections—either by memory or written notes—for third parties; one can imagine the enormity of this task if the shopper is selecting books for numerous third parties during a single shopping excursion. This task is the burden of the shopper because the "amazon.com" shopping technique only introduces third parties into the shopping experience at the tail-end of shopping, namely, when it is time to check-out the selected books. Only then is it possible to designate which selections are intended for third parties, and to provide shipping address information for such third parties. And to ensure that all parties receive the desired selections, the shopper must at this time complete the mechanical task of entering, for each selected book, the total number of books to be checked-out and paid for by the shopper—it is at this point in the shopping venture that the shopper must recall, via notes or memory, who is to receive which book—because only one of each selected book appears in the shopping cart.

To understand the limitations of this traditional approach to on-line purchasing utilizing the Internet, consider the following enhanced service (heretofore unavailable) to Internet users. One type of visual extension to the "shopping cart" analogy, as alluded to above and which is helpful in understanding aspects of the present inventive subject matter, is that of arranging the shopping cart with separate, virtual compartments—each compartment being associated with a single, unique party. For example, suppose a wife/mother desires to book-shop for her husband and two children as well as herself, then the virtual shopping cart has four separate compartments. The shopper then places the selected book into the compartment of the individual for whom the book is to be purchased. Moreover, it is readily visualized that the same book title may be purchased for more than one individual. For instance, two separate copies of the same book title—one book for each child—may be placed into each of the two shopping cart "children" compartments.

At check-out, the virtual shopping cart according to the present invention is emptied one compartment-at-a-time and these books may be shipped separately from other compartments; on the other hand, the total bill for all book purchases placed into separate compartments is paid by the single on-line shopper.

It is readily contemplated, even in view of only this high-level exposition of "amazon.com" compared to the inventive subject matter, that the shopping experience utilizing the inventive subject matter is what one would intuitively expect, whereas the "amazon.com" experience is counter-intuitive. From another viewpoint, the shopping experience in accordance with the inventive subject matter parallels an actual "in-store" shopping experience; moreover, such experience is the converse of the experience using "amazon.com".

Other key points of differentiation, which are not elaborated upon below, will become clear to the person of ordinary skill in the art after the detailed discussion of the present invention:

(a) with "amazon.com", if a shopper selects but does not purchase items, in order to retrieve the saved items for this particular shopper, it is necessary to log-on to "amazon.com" from the same computer that the shopper used to make the selections is initially; and (b) with "amazon.com", there is no purchase history for each of the parties for whom the shopper purchased books.

Thus, the art is thus devoid of teachings or suggestions whereby an on-line shopper can commence the shopping experience with the shopper first preparing a list of multiple third parties for whom the shopper desires to purchase selected books. In effect, this list "tags along" with the shopper, as the shopper searches on-line for books to purchase, in the same manner a "compartmentalized" shopping cart would be "pushed along" by a shopper. Then, the shopper can associate a selected book located during the on-line search as a book intended for the shopper and/or a third party, such as a spouse or child of the shopper.

Moreover, the art is devoid of mechanisms, visual or otherwise, to: (a) maintain the name list of parties for future use, including the ability to add or delete individual names and/or modify shipping instructions during the on-line shopping session; (b) maintain a history of purchases; (c) maintain an incomplete shopping activity, that is, the shopper has deposited books into the "compartmentalized" shopping cart but chooses during the immediate on-line session not to check-out, but rather postpones check-out to a later on-line session (with, of course, the ability to remove or add books to the shopping cart during the later session before check-out); (d) complete the order process for some or all of the selected books for some or all the parties, and save those books not purchased for later recall by the shopper; and (e) add a name(s) to the list of parties during the shopping experience whenever it is desired to associate a selected book with a new name.

SUMMARY OF THE INVENTION

These shortcomings and other limitations and deficiencies are obviated, in accordance with the present invention, by implementing a computer-implemented, multi-party merchandising service. This service engenders a buying experience for a purchaser that parallels the best aspects of an "in-store" experience, but also includes heretofore not contemplated aspects which can be advantageously provided by a computer system.

In accordance with a broad method aspect of the present invention, a method for merchandising items stored in a computer system to a customer communicating with the computer system includes: (a) generating, by the customer, a list of names for whom the customer may associate items; (b) automatically saving the name list in the computer system as the name list is generated; (c) selecting one of the items by the customer; (d) associating, by the customer, the selected item with a set of names on the name list to generate a selection list; and (e) automatically saving the selection list in the computer system.

In accordance with a broad system aspect of the present invention, a system for merchandising items stored in a computer system to a customer communicating with is commensurate with the broad method aspect of the present invention.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
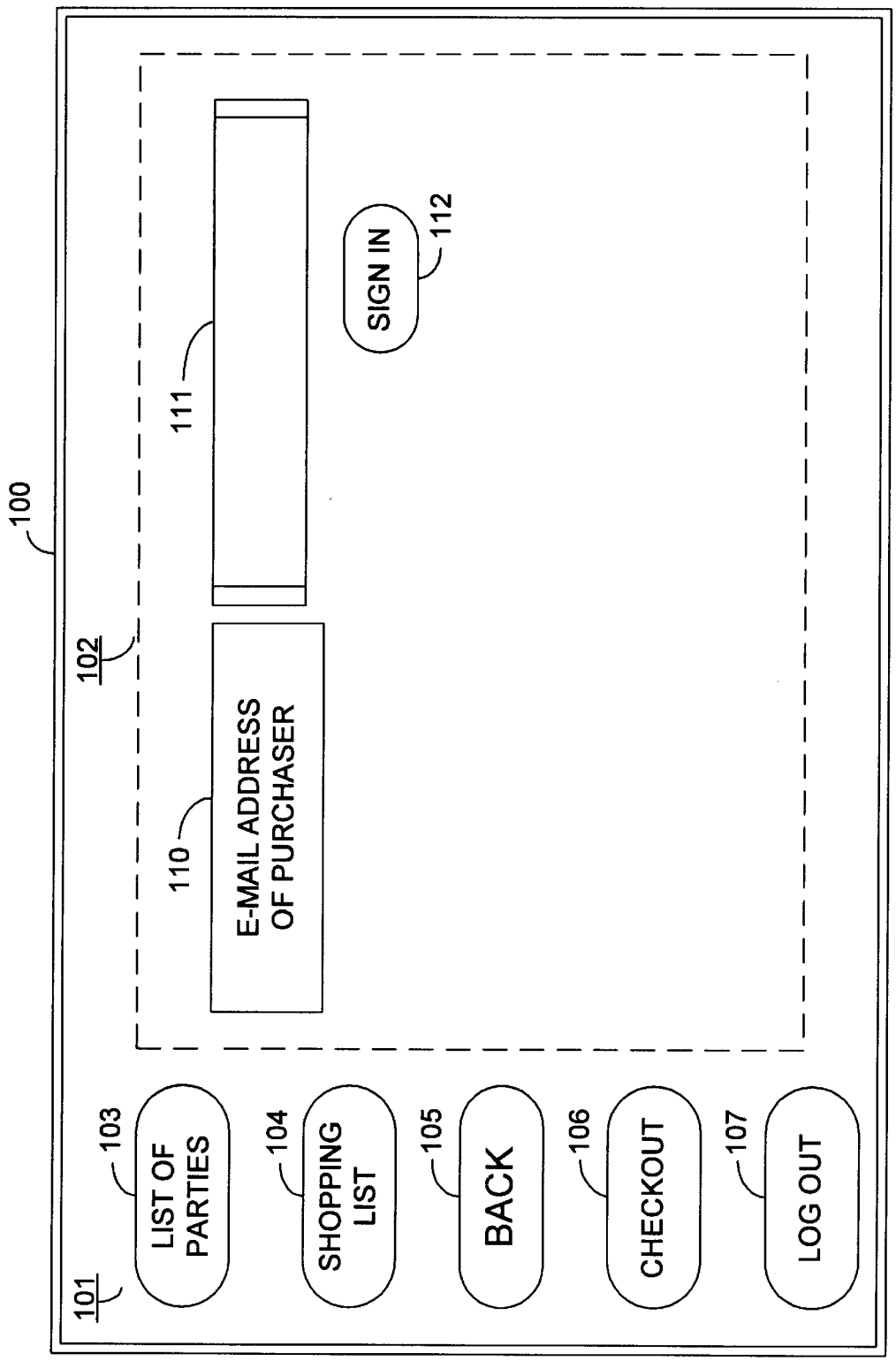
FIG. 1 depicts an exemplary screen display as a purchaser initiates a log-on session to the on-line merchandising system in accordance with the present invention.

Overview of the Utility of the Present Invention

It is instructive to first consider a "guided tour" on the manner in which a purchaser interacts with the inventive system; this guided tour is best illustrated by viewing a sequence of personal computer screen displays that depict purchaser inputs and then responses by the system as configured with the features of the present invention. This guided tour has the advantage of introducing terminology useful for later describing details of: (a) the methodology in terms of a flow diagram; and (b) the system in terms of a high-level block diagram.

For the sake of specificity, but without loss of generality, it is presumed that the system is configured for merchandising books on-line over the Internet. The principles of the inventive subject matter can be readily applied to other merchandising applications such as the sale of items or products, including drug store items, food items, compact discs, consumer electronics, games, and so forth, either on-line or even in a non-Internet application.

For purposes of the immediate discussion, the system should be visualized as a Web server accessible from a purchaser's personal computer (PC) over the Internet; the PC includes a monitor for displaying Web pages on the monitor's screen, a keyboard, and a "mouse". The system is configured with a set of application programs for servicing the purchaser's on-line inputs to the system from the PC.

The particular set of screen displays selected for the guided tour traces only one path of purchaser interaction through the system. However, this path is typical of the use of the system and, moreover, immediately and explicitly highlights the major differences between the present inventive subject matter and the prior art systems, of which "amazon.com" is representative. Because the present inventive system is versatile so as to accommodate the needs of many different types of purchasers, this path of the guided tour is but one of many potential paths through the system. Later, a detailed flow diagram of the methodology of the present invention will be presented which depicts the full versatility of the present invention.

Also, in order to ensure that the guided tour is truly informative of the major point-of-departure of the inventive subject matter from the prior art, certain presumptions are made about the status of the system as the purchaser logs-on to the system. It is well-known that generally there is a difference between the first time the purchaser logs-on to any system versus later log-ons. For instance, upon first log-on, the system may require that certain preliminaries-be furnished by the purchaser, such as name, address, phone number, e-mail address, and PIN number. Later log-ons typically only require the purchaser to input the e-mail address and/or PIN number to gain access to the system. Thus, for the guided tour, it is presumed that only an e-mail address is needed to access the system.

Moreover, it is assumed that during one or more past log-ons to the system, the purchaser has supplied certain information to the system regarding third parties for whom the purchaser is interested in selecting and then purchasing books, and that this information has been saved in the system for later recall by the purchaser (the manner in which this information is supplied initially and ultimately saved is covered when the detailed flow diagram of the methodology is discussed in the sequel). Accordingly, one should visualize for the guided tour through the system that, upon the log-on by the purchaser, the saved information can be recalled by the purchaser, and the purchaser then can use, add, delete, or modify the information as appropriate to the purchaser during the current log-on session.

With reference to FIG. 1, there is shown screen display 100 which appears on the purchaser's PC monitor in response to the system log-on request by the purchaser (such as by clicking on a "log-on" request button on the on-line merchandiser's home Web page (not shown)). The Web page shown on display 100 generally is divided into two areas, namely, a fixed-display region 101 and a variable-display region 102. Region 101 is fixed in the sense that the buttons 103–107 appear on the screen at all times, whereas region 102 displays information that varies as the purchaser enters inputs and makes selections of buttons that appear in region 102. (Oval buttons in the screen displays, such as buttons 103–107 or 112, are activated by clicking on the button-of-choice). Moreover, the selection of buttons 103–107 by the purchaser displays information in region 102 that results from processing by the system in response to activating buttons 103–107. The information that buttons 103–107 calls into view in region 102 is discussed after certain preliminaries are discussed.

Figure 2:
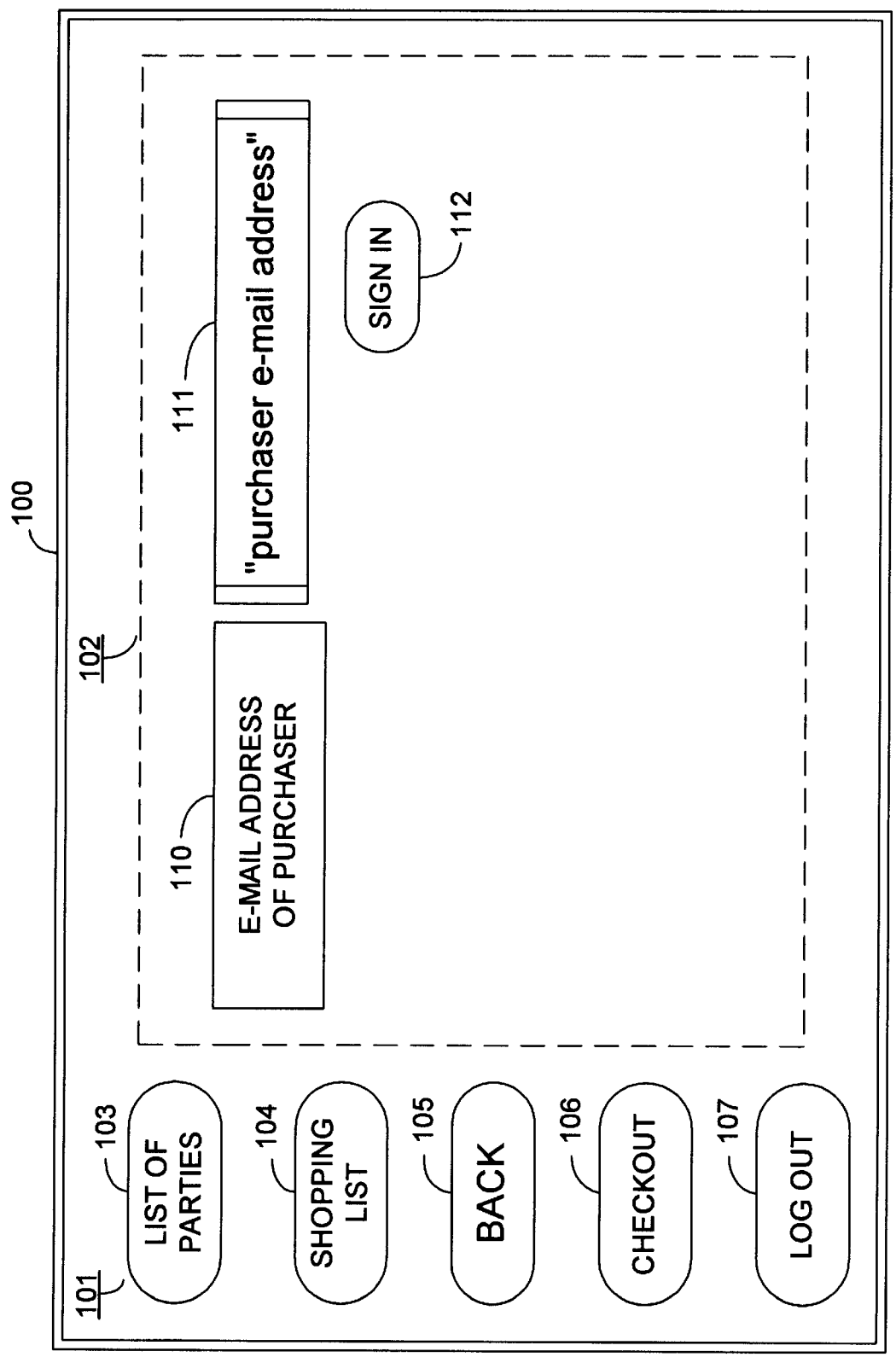
FIG. 2 depicts the screen of FIG. 1 with e-mail information necessary to complete the log-on process.

Upon the log-on request, the system returns message box 110 to alert the purchaser to input his/her e-mail address in box 111. Box 111 is empty when initially displayed by the system. The screen display in region 102 of FIG. 2 depicts box 111 filled-in with the requisite purchaser information, namely, "purchaser e-mail address" (the convention hereinafter is that information between "quotes" on screen displays is typed by the purchaser). This e-mail information is then transmitted to the system by clicking on 'Sign-in' button 112.

As outlined above, it is presumed that the purchaser has accessed the system in the past, so the system has a record of the e-mail address of the purchaser. Moreover, it is further assumed that during the past log-on session, the purchaser had created a list of prospective parties—the purchaser as well as third parties—for whom the purchaser desires to ultimately purchase books. When the purchaser logged-off in this prior session, the system automatically saves this list of parties in a "list of parties" file, as well as certain other information associated with each party that will soon be described.

Figure 3:
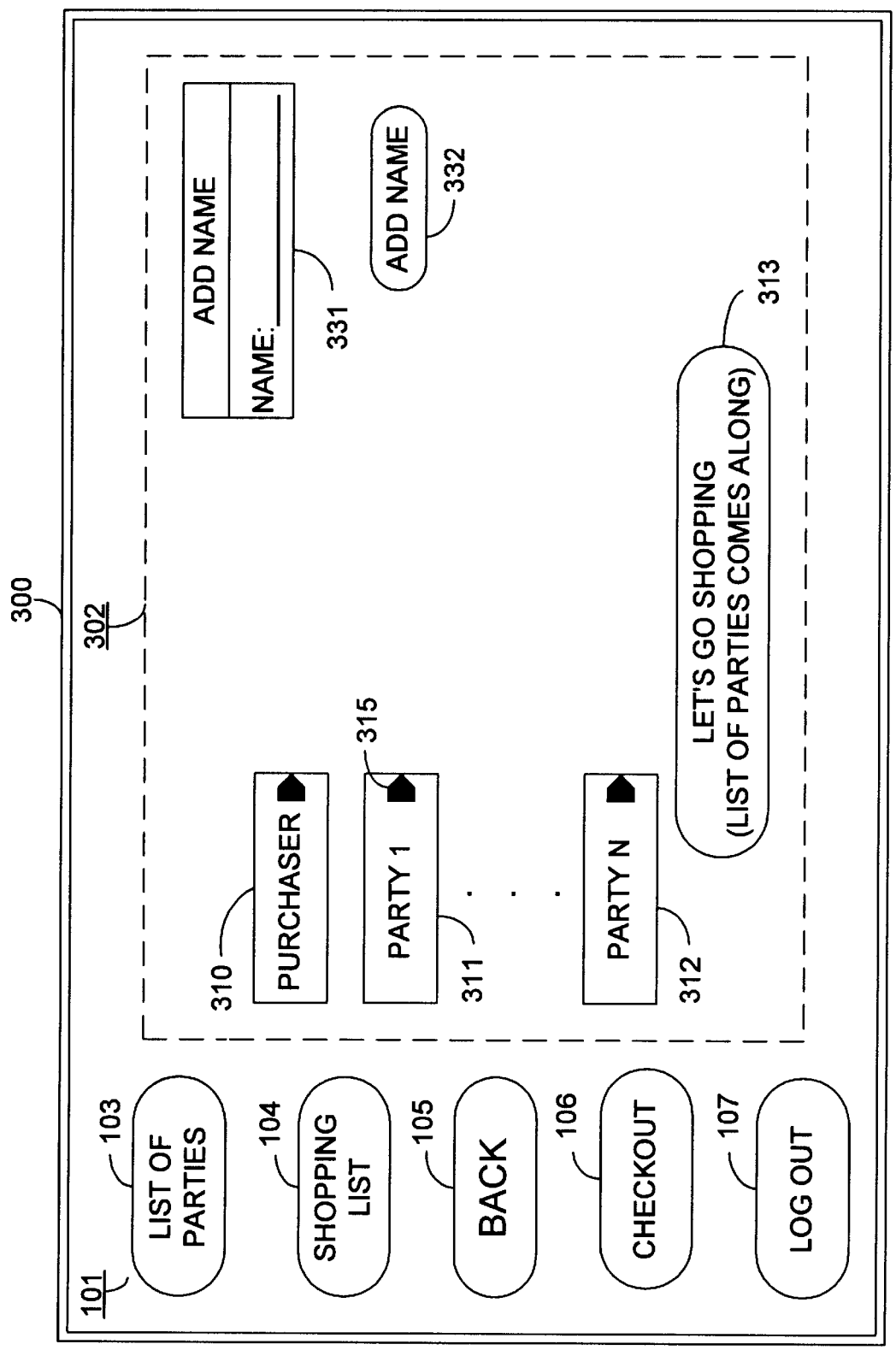
FIG. 3 depicts a resulting screen display once the purchaser has successfully logged-on to the on-line merchandising system.

Given these presumptions, the next screen displayed upon processing of the purchaser's e-mail address by the system is screen display 300 of FIG. 3. The appearance of the fixed-region 101 with buttons 103–107 is evident. In addition, variable-display region 302 now includes a number of message boxes, including: a display of the parties from the "list of parties" file, shown as PURCHASER in display area 310, PARTY 1 in area 311, . . . , PARTY N in area 312; and area 331, which displays the ADD NAME message and provides an area for inputting a new NAME to be appended to the "list of parties" file. Multiple parties can be inputted to the "list of parties" file by serially providing a new NAME for each of the multiple parties and clicking on 'Add Name' button 332.

It is noteworthy at this juncture to point out that clicking on button 103 results in the display of the "list of parties" file in region 302 as well. The utility of buttons 103–107 displayed in fixed-region 101 is that they can be invoked at any stage of the on-line shopping experience. In effect, these buttons are shortcuts to recall key information. Of course, it may not be logical to activate some of the buttons at various stages of the process because information needed to respond to the activated button may not yet be available. For instance, it may not logical to click on 'Checkout' button 105 until at least one book has been selected for purchasing.

Figure 4:
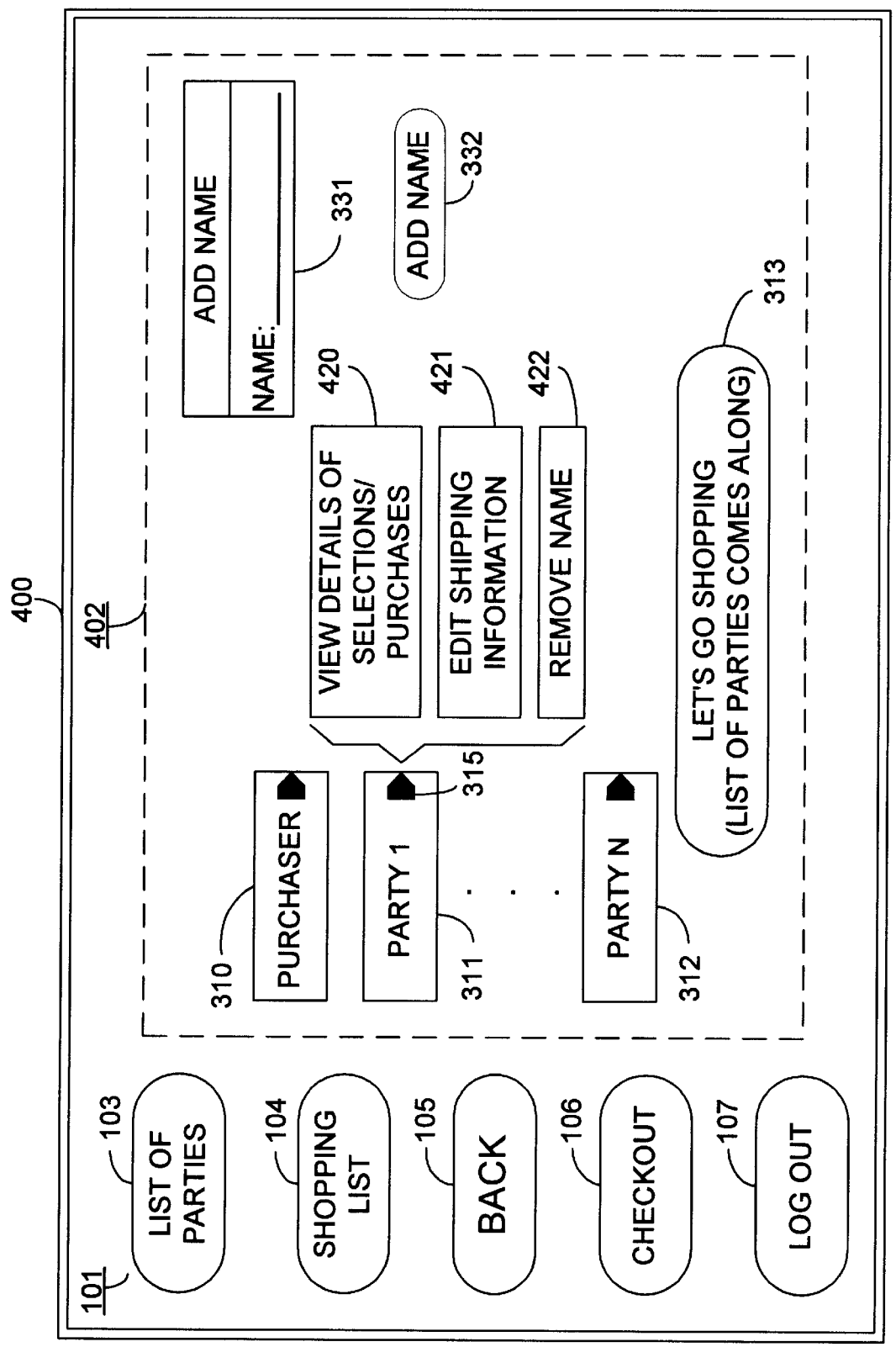
FIG. 4 depicts a resulting screen display when a pull-down menu of FIG. 3 associated with a named party is invoked.

Also shown in each message box 310–312 is a "pull-down arrow"; arrow 315 of PARTY 1 box 311 is exemplary. Clicking on arrow 315 with the mouse pulls down three menu boxes, as depicted in FIG. 4: menu box 420 having the descriptor 'view details of selections/purchases'; box 421 'edit shipping information'; and box 422 'remove name' (except the PURCHASER).

The action which results from clicking on-menu box 422 is straightforward, namely, the "list of parties" file is purged of the named party, as well as all other associated information. Moreover, the action resulting from clicking on menu box 421 is also rather straightforward—the "list of parties" file is accessed and displayed, and the shipping information, if any, stored from any prior log-on session is displayed in variable-region 402; this shipping information may then be updated by the purchaser at this time.

To describe the action that results from clicking on menu box 420 requires first an explanation of certain terminology. To this end, the notion of the "selection" of a book must be distinguished from the notion of the "purchase" of a book. Recalling the "shopping cart" analogy introduced in the Background Section, the purchaser typically must first search or scan through a list of books available from the on-line book seller to locate a specific book, and then place this book into the appropriate compartment in the shopping cart. During this so-called selection phase, the purchaser is carrying out only the book "selection" activity—no actual "purchase" of books has yet occurred. It is plausible at this point in the on-line session and, indeed, is oftentimes the case, that the on-line purchaser decides that he/she merely wishes to "select" books for himself/herself and/or other parties, and the purchaser does not intend to complete the purchase of books until a later on-line session. Such a situation may occur, for instance, because the purchaser learns of another book during the on-line search that may be of interest to a third party, and the purchaser desires to verify this interest before buying this book. It is therefore imperative, from a service provision viewpoint, to configure the system with a mechanism whereby selected books are saved in a "selection list" file for recall by the purchaser during a later log-on session. Of course, it is also necessary to configure the system such that both the selection of and purchase of books can be completed during a single on-line session.

Figure 5:
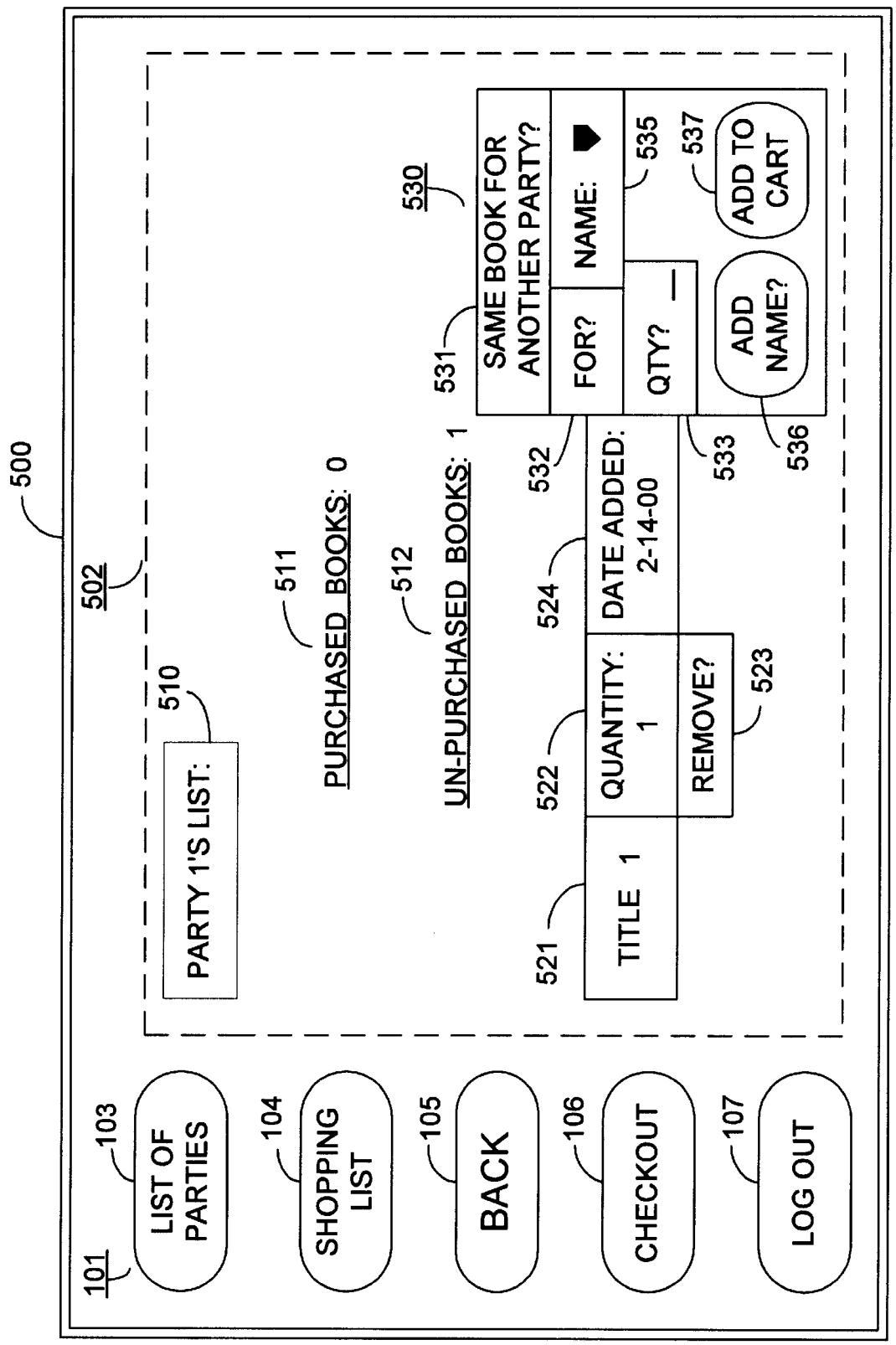
FIG. 5 depicts a screen display resulting from the purchaser requesting the menu item relating to a view of the details of selections/purchases for a given party.

When the selected books are ultimately purchased (called "order fulfillment" in the sequel), it is also an advantageous feature of the system to store is information pertaining to all purchased books in a file, called the "purchase history" file, so the purchaser has a record of purchasing activities. Hence each party (the purchaser or other third party) has associated "selection list" and "purchase history" files. The combination of these two files for all parties is referred to as the "shopping list" file, and this latter file may be called into view into the variable-display region by clicking on button 104 in the fixed-display region. It is also possible to call into view the "shopping list" file to review the selection/purchase status for each party individually, as will be exemplified below when FIG. 5 is described.

One previously-introduced concept must be treated in somewhat more detail before continuing with the guided tour of the system via the screen displays; this concept deals with the exact composition of the "selection list" file. When the purchaser logs-on to the current session, the purchaser can recall the "selection list" file which was saved automatically during the last log-on session. Then the purchaser can make selections of books during the current session. Both the earlier-saved selections and the current selections coalesce into one file during the current session, namely, the file that has already been referred to as the "selection list" file. Thus, all books selected in past log-on sessions and the current on-line session which have not been purchased become candidates for purchase during the present session or, if not purchased, the updated "selection list" file is saved for the next on-line session.

Further manifestations of these features alluded to above will now be exhibited as the guided tour continues. With reference to FIG. 5, there is shown screen display 500, including variable-display area 502, which results from clicking on button 420 ('view details of selections/purchases') in FIG. 4. The system then displays the "shopping list" for only PARTY 1, namely, PARTY 1's LIST, as summarized in display box 510. PARTY 1's LIST is partitioned into two display areas—the PURCHASED BOOKS area 511 and the UN-PURCHASED BOOKS area 512. Area 511 displays the "purchase history" file for this party from all past log-on sessions, and area 512 displays the "selection list" file for this party. For the display, it is clear that no books have yet been purchased for this party (PURCHASED BOOKS: 0), and only one book has been selected for this party (UN-PURCHASED BOOKS: 1).

Details of the books in the "selection list" file are then displayed in the UN-PURCHASED BOOKS area 512. In particular, each book has the following associated fields: (a) field 521—title of the book (TITLE 1); (b) field 522—book quantity (QUANTITY), showing one book; (c) field 523—a decision point whereby the purchaser may choose to remove the book from the "selection list" file at this juncture; (d) field 524—the date the book was added to the "selection list" file (DATE ADDED:); and (e) field 530, having a number of sub-fields as follows. Sub-field 531 indicates that this book may be selected for another party at this point in the process (SAME BOOK FOR ANOTHER PARTY?). Sub-field 532 asks the question FOR?, meaning for what additional party, if any, does the purchaser desire to purchase this particular book. The purchaser can identify one or more parties by sequentially pulling down the names in the "list of parties" file by clicking on the "pull-down arrow" in NAME sub-field 535. For each additional party so selected, a desired number of books may be associated with this selection via quantity sub-field 533 (QTY?). An affirmative step must be taken to actually add the book(s) for the selected party to the associated "selection list" file by clicking on 'Add to Cart' button 537. Moreover, if the purchaser desires to add a new party to the "list of parties" file and, correspondingly, the selected book to the "selection list" file, this may be accomplished at this point by clicking on 'Add Name' button 536, which invokes system processing substantially the same as that described with respect to the ADD NAME box 331 in FIG. 4.

Figure 6:
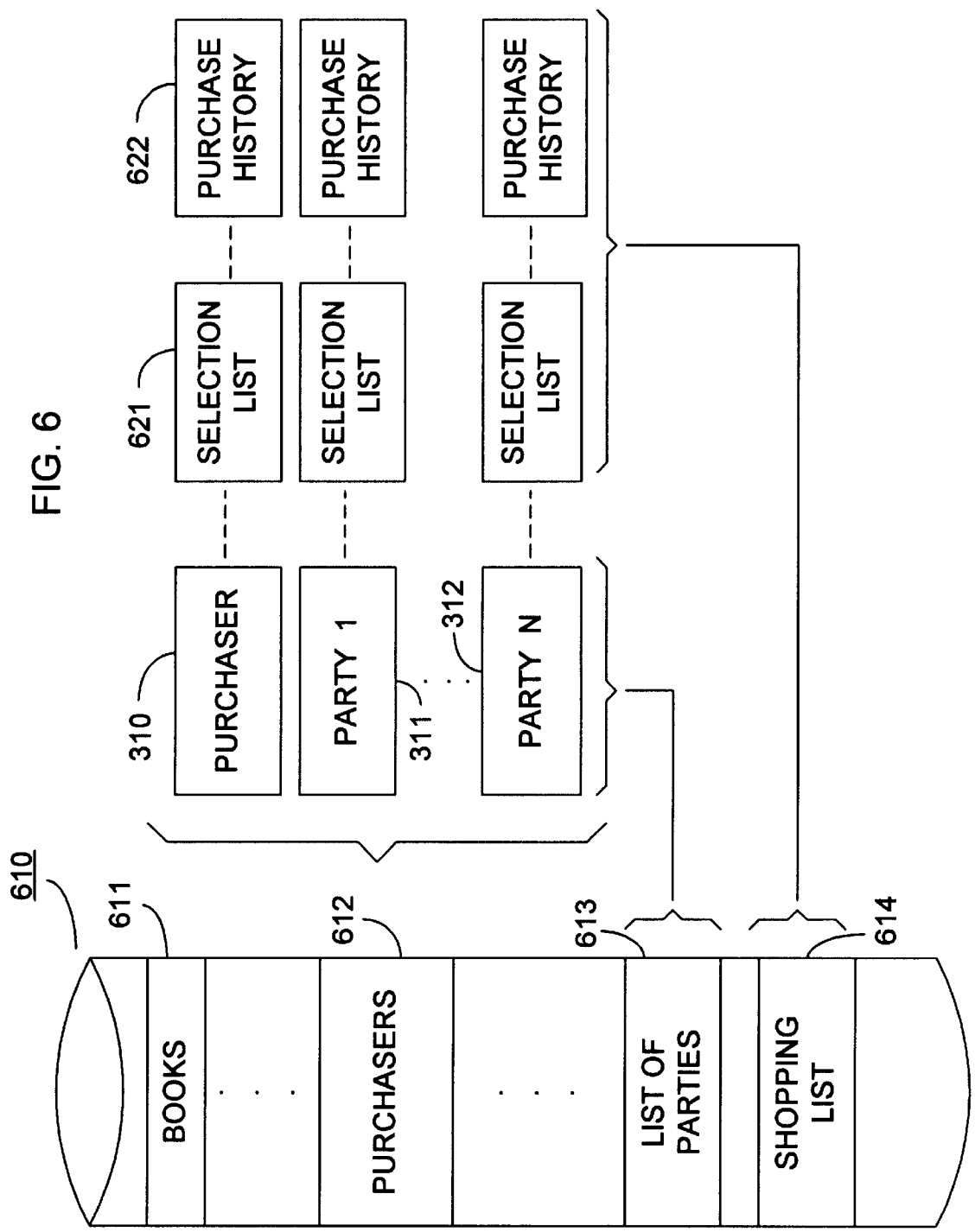
FIG. 6 is a pictorial representation of a system database for storing the list of registered purchasers, the "list of parties" file and the "shopping list" file for each purchaser, as well as the inventory (e.g., books) available via the system.

A pictorial representation of the manner in which various files discussed above are stored in the system is shown in FIG. 6. Database 610 is associated with the Web server, that is, database 610 is a central storage device for storing the system files. Storage area 611 is representative of the inventory of books available for perusal by the purchaser. Storage area 612 stores, for example, the e-mail addresses of registered purchasers. Storage area 613 is representative of the "list of parties" file, whereas storage area 614 represents the "shopping list" file. Each registered purchaser has an associated set of files shown by the matrix arrangement in the right hand portion of FIG. 6, namely: (a) each registered purchaser has a subarea of area 613 wherein the purchaser and his/her associated parties can be accessed, this subarea being composed of information about the purchaser (element 310), and each party (elements 311 and 312); and (b) each party has an associated subarea of area 614 wherein the "selection list" file and the "purchase history" file are stored, with subarea 621 and 622 being representative of these respective files for the purchaser.

It is now supposed that the purchaser, after having reviewed the "shopping list" for each party, desires to select new books for the parties. The purchaser can backtrack from the display of FIG. 5 and re-display FIG. 3 by clicking on 'Back' button 105 of the display in FIG. 5, and again on 'Back' button 105 of the display of FIG. 4 to retrieve the display of FIG. 3. Button 313 in FIG. 3 has not previously been discussed, but from its descriptor ('let's go shopping (list of parties comes along)'), it is imminently clear that the purchaser can embark on the selection phase of the process by clicking on button 313 and, moreover, the "list of parties"

file will be readily accessible or, equivalently, a virtual compartmentalized shopping cart is instantiated especially for the purchaser.

Figure 7:
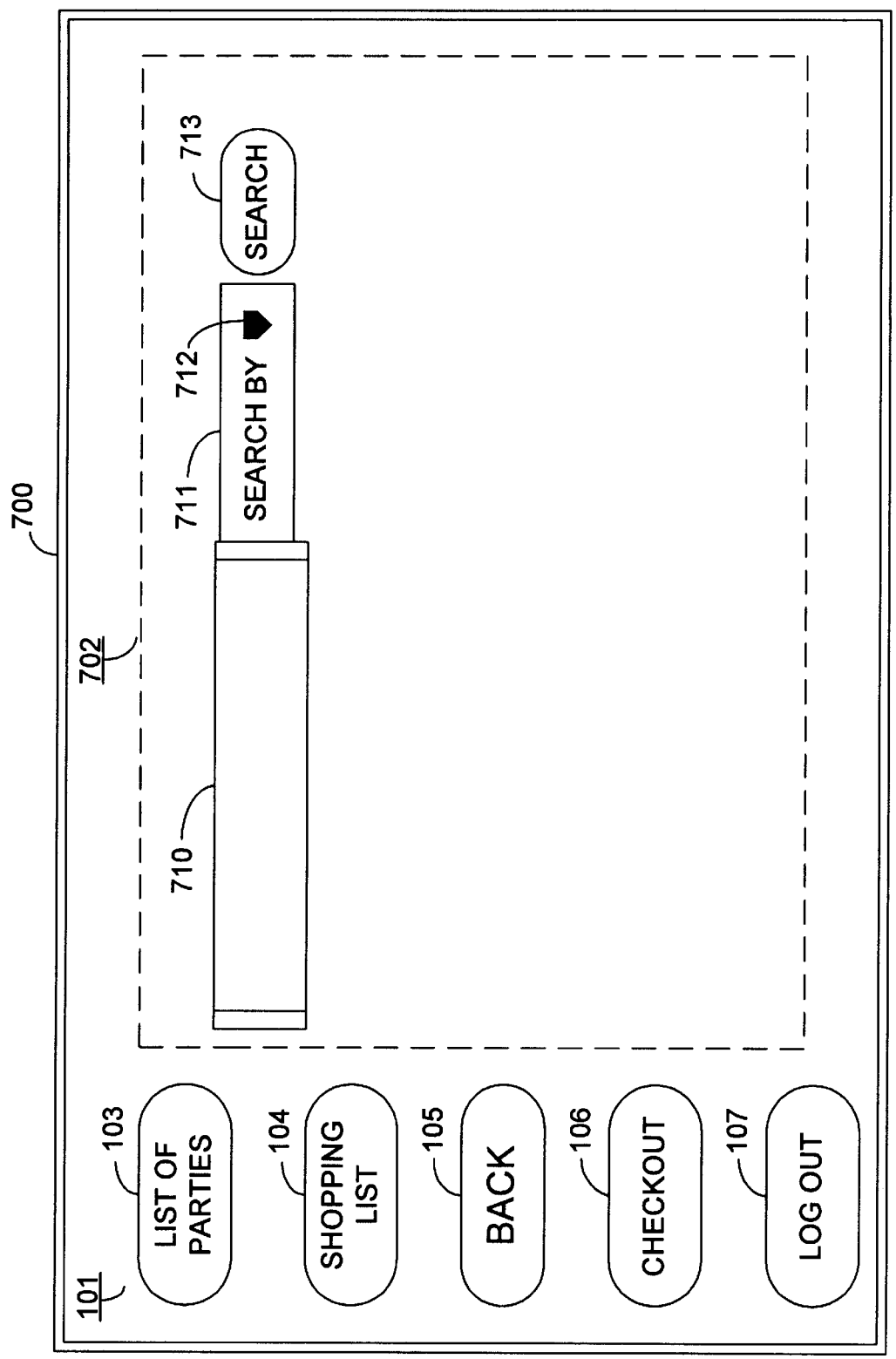
FIG. 7 depicts the screen display resulting from the purchaser invoking the "Let's Go Shopping" button of FIG. 3.
Figure 8:
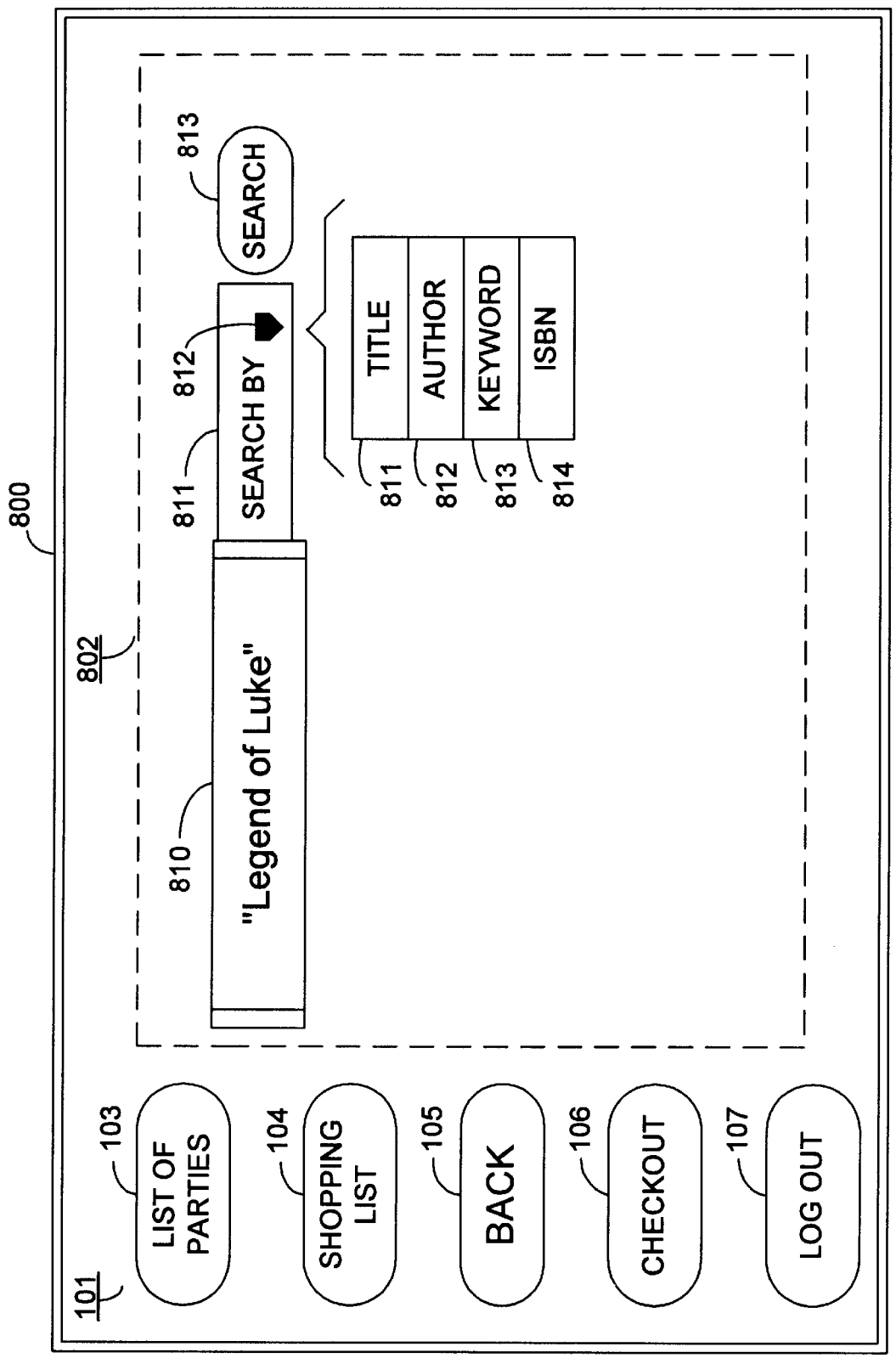
FIG. 8 depicts exemplary input by the purchaser to locate a book in the system inventory of books.

After clicking upon button 313 of FIG. 3, the system response is display 700 of FIG. 7, with the focus being on variable display area 702. In area 702, blank box 710 is presented, along with "Search By" message box 711 with associated "pull-down" arrow 712. The purchaser enters into box 710 relevant information to search for a book, such as the title, author, keyword, or ISBN number; an example of information entered by the purchaser is shown in FIG. 8, wherein the book title "Legend of Luke" is entered in box 810. Moreover, the purchaser has clicked on "pull-down arrow" 712 of FIG. 7 to display information boxes 811–814 in FIG. 8. Since a title was entered in box 810, box 811 is clicked upon by the purchaser. Then the search is initiated by the purchaser by clicking on 'Search' button 713.

Figure 9:
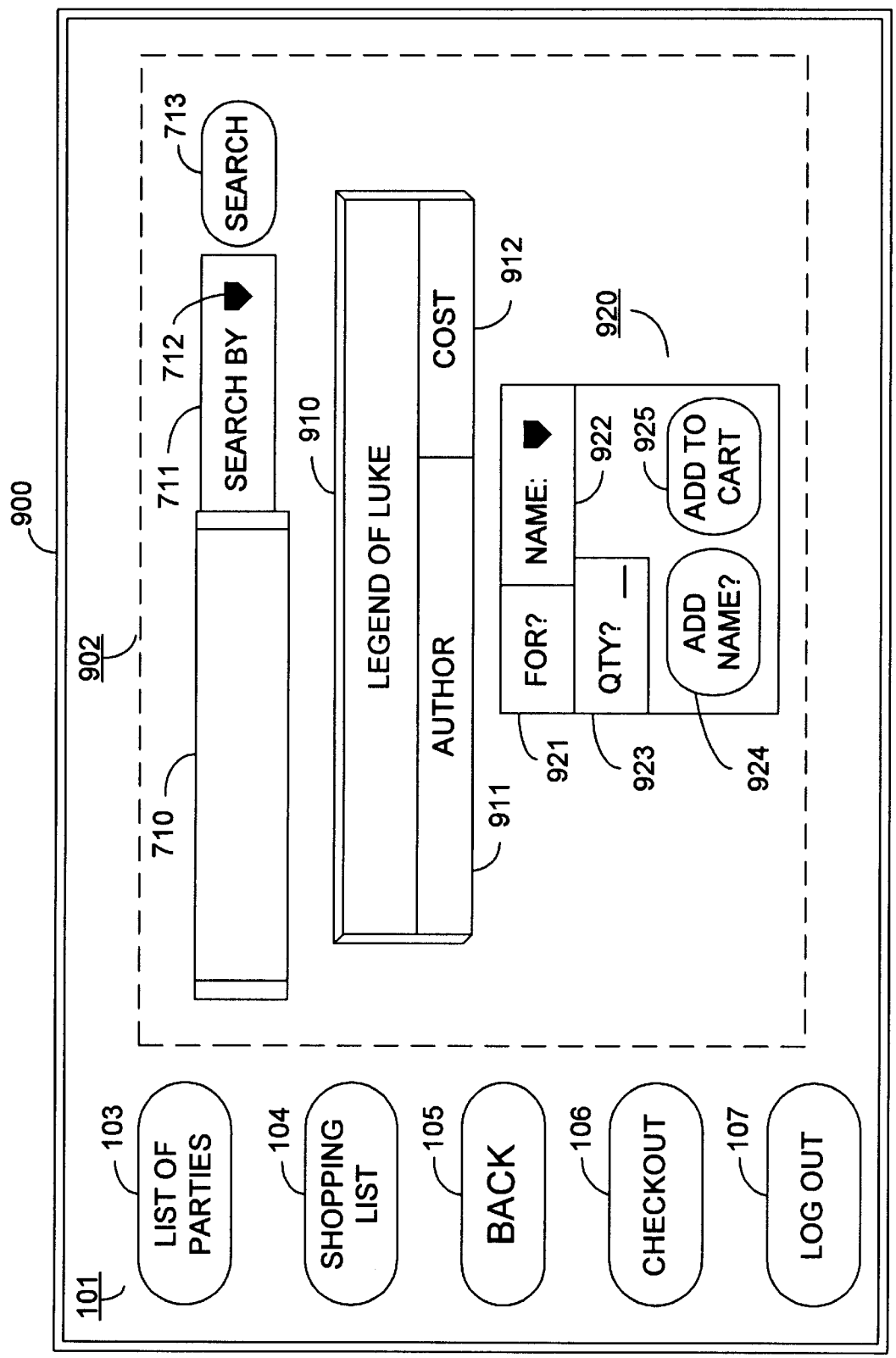
FIG. 9 depicts the system response to the input of FIG. 8.

The results of the search based upon the information entered in FIG. 8 is depicted in screen display 900 of FIG. 9, with initially the focus being on middle portion of variable-display area 902. In this portion, box 910 displays the title of the book as located by the system search. Box 911 lists the author of the book, and box 912 shows the cost of the book. This "selection activity" is independent of any particular party, that is, no party presently on the "list of parties" has this selection associated with him/her.

At this juncture, the purchaser has some decisions—only two will be elucidated. First, the purchaser may, for whatever reason, decide not to associate this book with any party, that is, not enter the selection into the party's "selection list" file. Accordingly, the top portion of display 902, which is the same as that displayed in display area 702 of FIG. 7, provides ready access to commence a new search. Each time a new search is completed, a display identical to that of FIG. 9 is shown.

Second, the purchaser may decide to select this book for one or more parties. To see how this is accomplished, the focus is now on lower portion 920 of FIG. 9. Sub-field 921 asks the question FOR?, meaning for what party, if any, does the purchaser desire to purchase this particular book. The purchaser can identify one or more parties by sequentially pulling down the names in the "list of parties" file by clicking on the "pull-down arrow" in NAME sub-field 922. For each party so selected, a desired number of books may be associated with this selection via quantity sub-field 923 (QTY?). An affirmative step must be taken to actually add the book for the selected party to the associated "selection list" file by clicking on 'Add to Cart' button 925. Moreover, if the purchaser desires to add a new party to the "list of parties" file and, correspondingly, the selected book to the "selection list" file, this may be accomplished at this point by clicking on 'Add Name' button 924, which invokes system processing substantially the same as that described with respect to the ADD NAME box 331 in FIG. 4.

It is now supposed that the purchaser has selected a number of books and has associated selected books with various parties in the "list of parties" file, and the purchaser desires to view a summary of the book "selection" activity. The purchaser then clicks on 'Shopping List' button 104 of FIG. 9, with the result being display 1000 of FIG. 10, and again the focus is on variable-display area 1002. Each party having at least one book in their "shopping list" file is displayed. In the example shown in FIG. 10, two parties—the Purchaser and Party 1—have books in their "shopping list" file. The purchaser has only one associated book, namely, Book 1 as displayed in box 1021. The cost of this book is displayed in box 1022, the quantity of this book selected for the purchaser is displayed in box 1023, and the subtotal for the Book 1 is shown in box 1024. The purchaser may decide at this point to remove this selection, as depicted by the REMOVE? message is box 1025.

Party 1 has only two associated books, namely, Book 1 and Book 2. The cost of each book, the number of books for each title as selected by the purchaser, and the subtotal for each book is shown in the same manner as for the purchaser. The purchaser may decide at this point to remove this selection, as depicted by the REMOVE? message associated with each book.

To further keep the purchaser apprised of valuable information upon which to base his/her purchases, message 1031 displays GRAND TOTAL dollar amount of the selections (recall that no actual purchasers have yet occurred), as well as a subtotal for each party.

Again the purchaser has a number of decisions at this point—again only two are exhibited. First, the purchaser may decide to continue shopping, and 'Continue Shopping' button 1030 is convenient for this purpose. Screen display 700 of FIG. 7 is then displayed to the purchaser.

Figure 10:
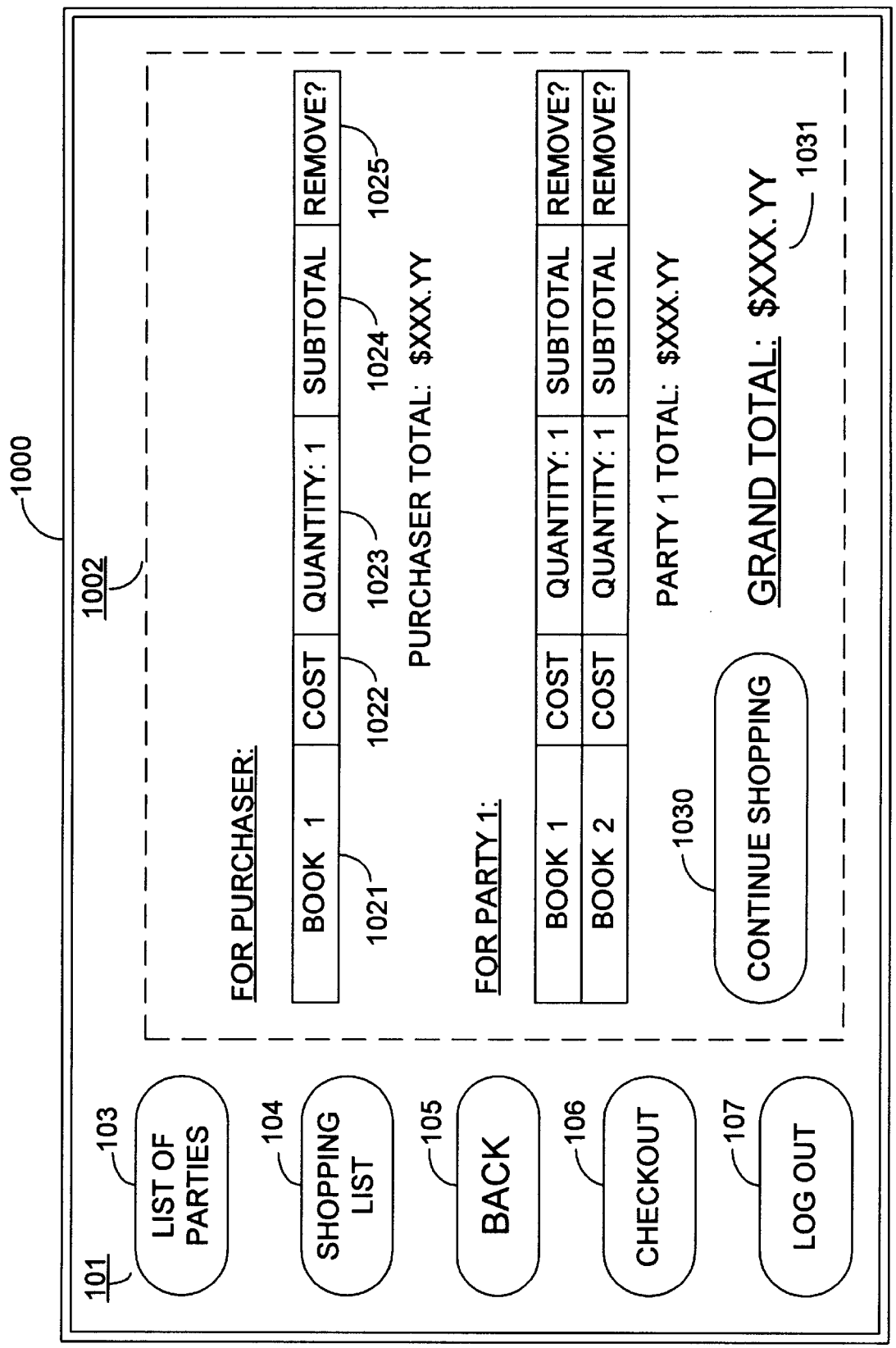
FIG. 10 depicts the system response to the purchaser's requests to view the "shopping list" file.
Figure 11:
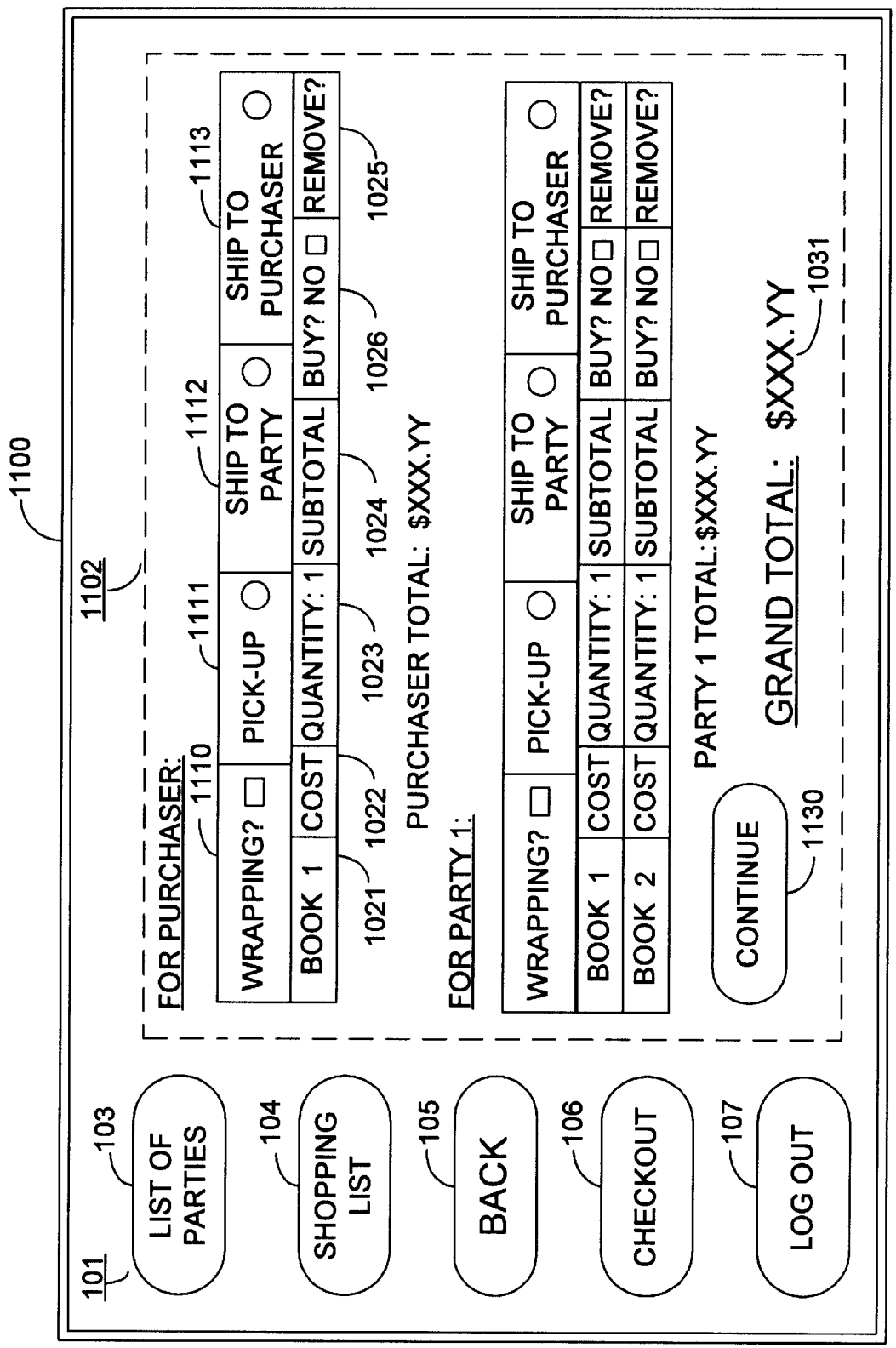
FIG. 11 depicts the system response to the purchaser request to "check-out"

Second, the purchaser may decide to check-out, that is, advance to the step of "order fulfillment"; this is accomplished by clicking on 'Checkout' button 106 of FIG. 10. Screen display 1100 of FIG. 11 is the response of the system to the check-out request by the purchaser. By comparing variable-display areas 1002 and 1102 of FIGS. 10 and 11, it is apparent that display 1102 is an augmented version of display area 1002. In particular, messages boxes 1110–1113 have been appended to information in each party's "selection list" file, and message box 1026 has been appended for each selected book. Box 1110 is used to designate whether or not the book selection for the purchaser is to be gift-wrapped (clicking on the small box after the question WRAPPING? suffices). Also, only one of the three boxes 1111–1113 can be checked since the choices are mutually exclusive.

Moreover, to provide added flexibility to the shopping experience, the purchaser may choose at this time to purchase only some of the books for each of the parties. For instance, the purchaser may decide to only buy Book 2 for Party 1, and delay any other purchase decisions to a later time, either in this session or later sessions. Accordingly, a BUY? NO message box (box 1026 for the purchaser is exemplary) is associated with each book. The book will go through the "order fulfillment" phase unless box 1026 has NO checked.

The total shown in message box 1031 of FIG. 11 is the total for all those books identified for purchase, that is, the total is exclusive of those having check marks after the BUY? NO message.

Figure 12:
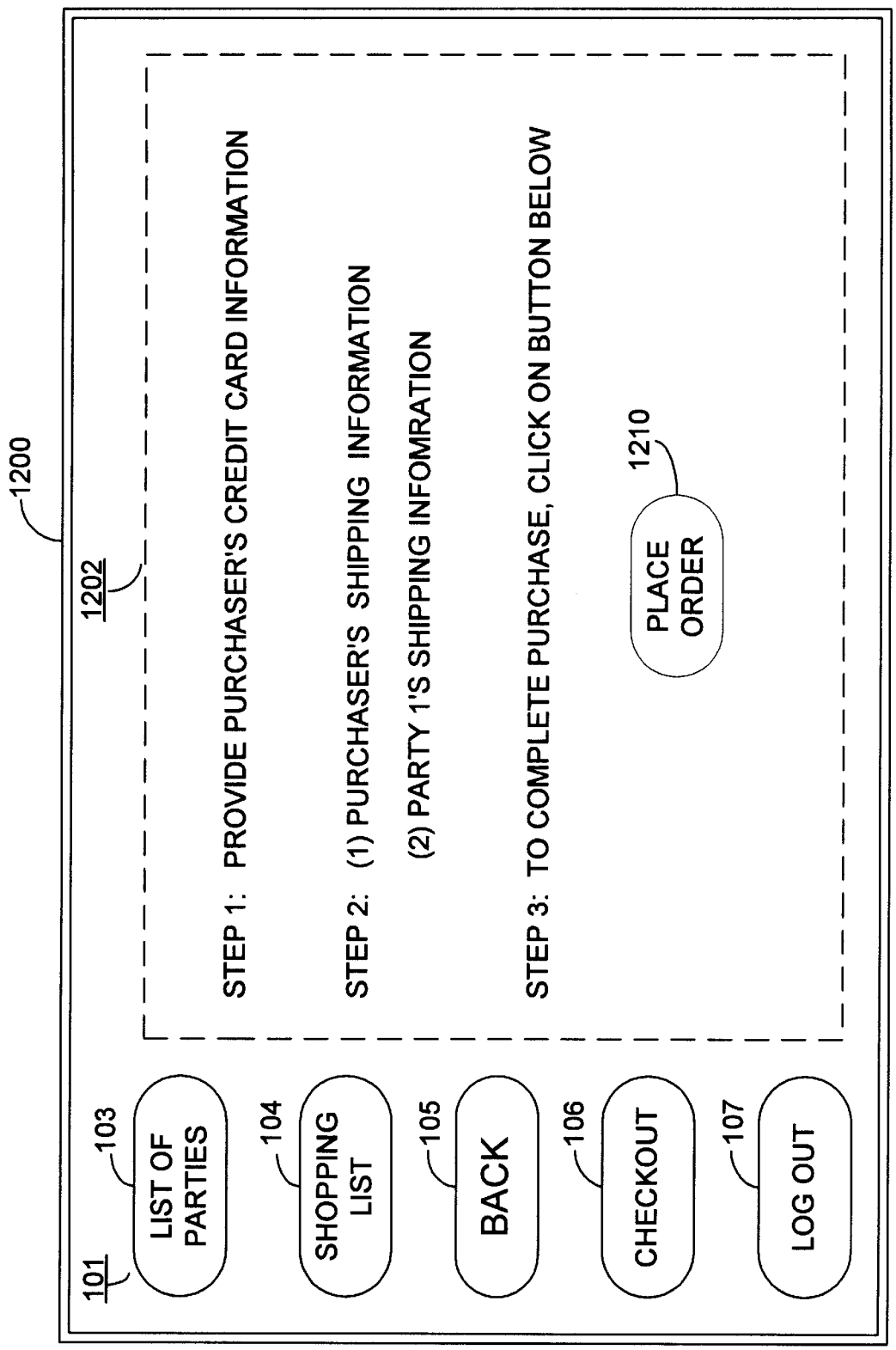
FIG. 12 depicts the system response to a "check-out" request once books have been selected by the purchaser.

The next screen that is displayed is screen display 1200 of FIG. 12, which is invoked by clicking on 'Continue' button 1130 of FIG. 11. Variable-display area 1202 shows that it is necessary to provide data or initiate an action in three sequential steps to fulfill or complete the order. In Step 1, the purchaser provides credit card information, such as card number and expiration date in a format suitable for processing by the system. For instance, an input box could be displayed to the purchaser with the request to input card number and expiration date in sub-fields of the display box. In Step 2, the shipping information of the parties receiving books is displayed based on shipping information, if any, in the "list of parties" file, and any information can be updated. Only those parties having receiving books directly via a "ship to" party designation in FIG. 11 have shipping information displayed for possible update in FIG. 12. In final Step 3, the order can be completed by clicking on 'Place Order' button 1210, whereupon the "selection list" file and the "purchase history" are immediately updated.

Figure 13:
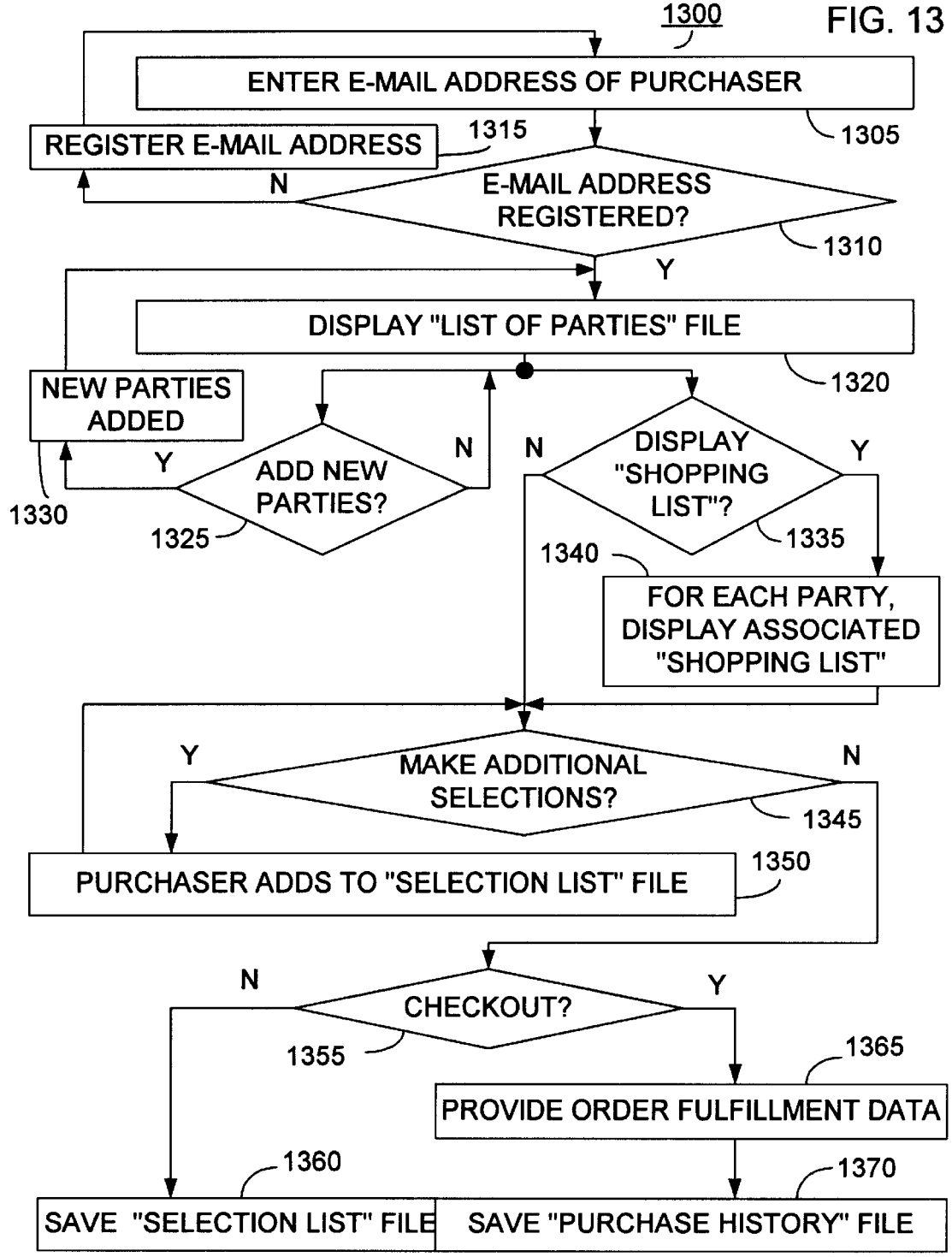
FIG. 13 is a flow diagram of the methodology as exemplified by the guided tour shown in FIGS. 1–5 and FIGS. 7–12.

Before considering a more detailed flow diagram, it is worthwhile to illustrate a flow diagram representative of the essentials of the guided tour, shown as flow diagram 1300 of FIG. 13. After clicking on the log-on area of the merchandiser's Web page to access the book purchasing system, processing block 1305 is executed to request the e-mail address of the purchaser (FIG. 1). Once the purchaser inputs his/her e-mail address (FIG. 2), the processing of decision block 1310 is invoked to determine if the e-mail address is registered in the system. If not, then a registration session is initiated and completed with the new purchaser, via processing block 1315, to register the new purchaser. Presuming the purchaser is registered, then processing block 1320 is executed to display the "list of parties" to the purchaser (FIG. 3). At this point, via decision block 1325, it is possible for the purchaser to add new names to the "list of parties", as exemplified by processing block 1330 (FIG. 4). Moreover, it is also possible at this juncture to determine, via decision block 1335, if the purchaser desires to view the "shopping list" for each party (FIG. 4) and, if so, processing block 1340 is invoked to display the "shopping list" file for each party individually (FIG. 5). If the "shopping list" display is by-passed, then decision block 1345 is entered to determine if the purchaser desires to make additional selections or begin to compile/update the "selection list" file (FIG. 7). If so, the purchaser selects additional books iteratively via processing block 1350 and decision block 1345 (FIGS. 8 and 9). Once no additional selections are desired, then decision block 1355 is entered to determine if order fulfillment is required, usually after viewing the complete "shopping list" file for all parties on the "list of parties" that have selections associated with them (FIG. 10). If not, then the "selection file" list is saved for later, as evidenced by processing block 1360. If check-out is desired (FIG. 11), then processing block 1365 is entered to provide data for order fulfillment (FIG. 12), and once the order is executed, then the purchases are saved in the "purchase history" file via processing block 1370, again for later recall.

Detailed Flow Diagram

Figure 14:
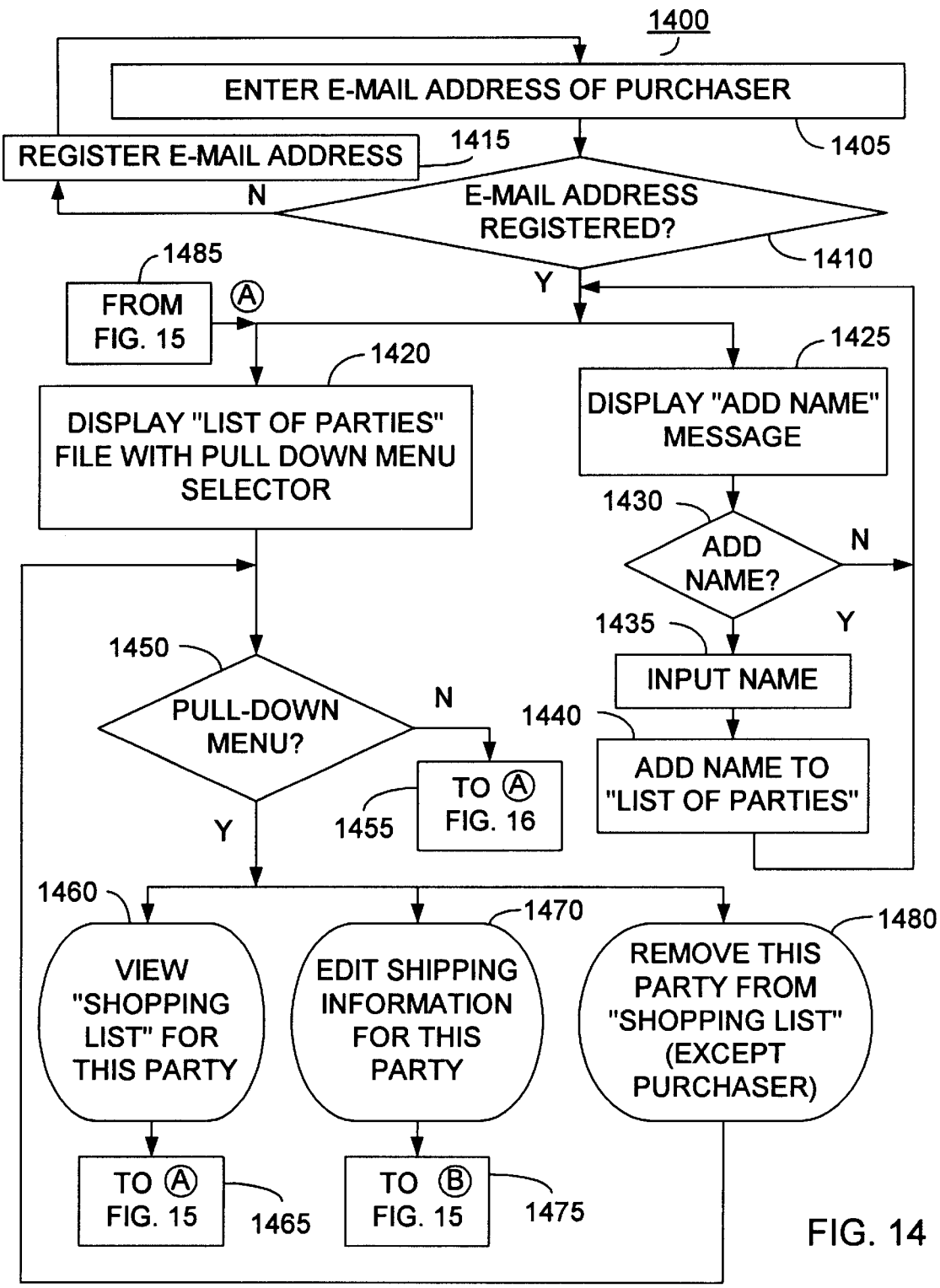
FIGS. 14–17 depict the detailed flow diagram of the methodology in accordance with the present invention.

The discussion of the detailed processing carried out by an illustrative embodiment in accordance with the present invention commences with flow diagram 1400 of FIG. 14. As with FIG. 13, the starting point is the processing effected by blocks 1405, 1410, and 1415, namely: if the purchaser is not registered, as determined via decision block 1410, upon entry of his/her e-mail address (block 1405), then a registration process is executed (block 1415). Once registered, then both processing blocks 1420 and 1425 are executed to present the "list of parties" and the ADD NAME message. From block 1420, the purchaser can decide whether or not (decision block 1450) to invoke the pull-down menu; if not, then the processing branches to point A of FIG. 16. If so, then the pull-down menu displays three options, depicted by "display screens" 1460, 1470, and 1480. If there is a request by the purchaser to view the "shopping list" for a party (screen 1460), then the processing branches to point A of FIG. 15. If there is a request to edit the shipping information for this party (screen 1470), then the processing branches to point B of FIG. 15. Lastly, if the choice is to remove the party (except for the purchaser) from the "shopping list" (screen 1480), then the party is removed and processing returns to pull-down decision block 1450.

Returning to the processing following the ADD NAME message (block 1425), decision block 1430 is entered to determine whether or not the purchaser desires to add a new name. If not, then there is no change in the display. If so, then the purchaser enters the new name (processing block 1435), and via processing block 1440, the new name is added to the "list of parties". Once completed, then the processing is returned to point A of FIG. 14 (point A is also the input point from FIG. 15, as per block 1485).

Figure 15:
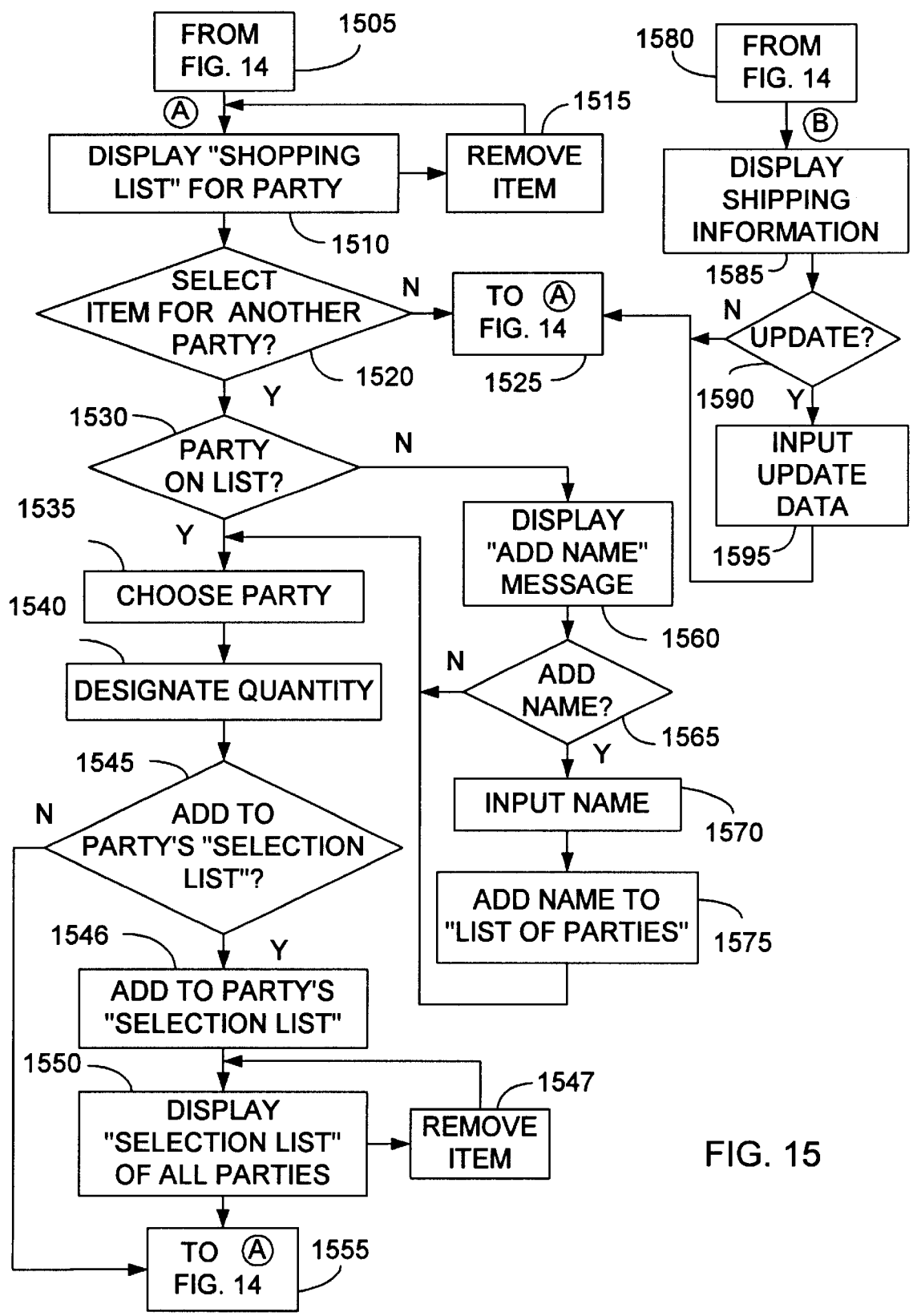

Now with reference to FIG. 15, point A in the flow diagram is arrived at via input block 1505 referencing FIG. 14. Next, processing block 1510 is entered to display the "shopping list" for the party. It is possible at this point to remove an item, via processing block 1515, whereupon processing is returned again to point A. It is also possible, once the "shopping list" is displayed for this party, to select an item from the "shopping list" for another party. The decision whether or not this is a desired action is accomplished by decision block 1520. If this action is not desired, the processing branches back to point A of FIG. 14 (block 1525). If this action is desired, it must be determined if the party is a name on the "list of parties", as per decision block 1530. If the party is not on the list, then processing is effected serially by blocks 1560, 1565, 1570, and 1575 which accomplishes basically the same processing already described with respect to blocks 1425, 1430, 1435, and 1440 of FIG. 14. Upon adding a new party, processing by block 1535 is next invoked. This is the same processing block entered from decision block 1530 if the party is already on the list. As is evident by processing blocks 1535 and 1540, both the party and the quantity of the item desired for the party are chosen by the purchaser. At this stage the purchaser may decide to bypass adding the selected item to the party's "selection list", as per decision block 1545, and processing branches to point A of FIG. 14 (shown by block 1555). The item is added to the party's "selection list" via processing block 1546. After this, as indicated by processing block 1550, there is a display of the "selection list" for all parties. It is possible at this stage to remove an item from the "selection list", as per the processing invoked by block 1547. Otherwise, there is a branch to point A of FIG. 14.

With reference to point B of FIG. 15, which is arrived at via block 1580 referencing FIG. 14, the first processing taking place is to display shipping information for the party via processing block 1585. Next, decision block 1590 is executed to determine if an update to the shipping information is required. If not, then there is a branch to point A of FIG. 14. If an update is required, as per processing block 1595, the updated data is entered, whereupon processing branches to point A of FIG. 14.

Figure 16:
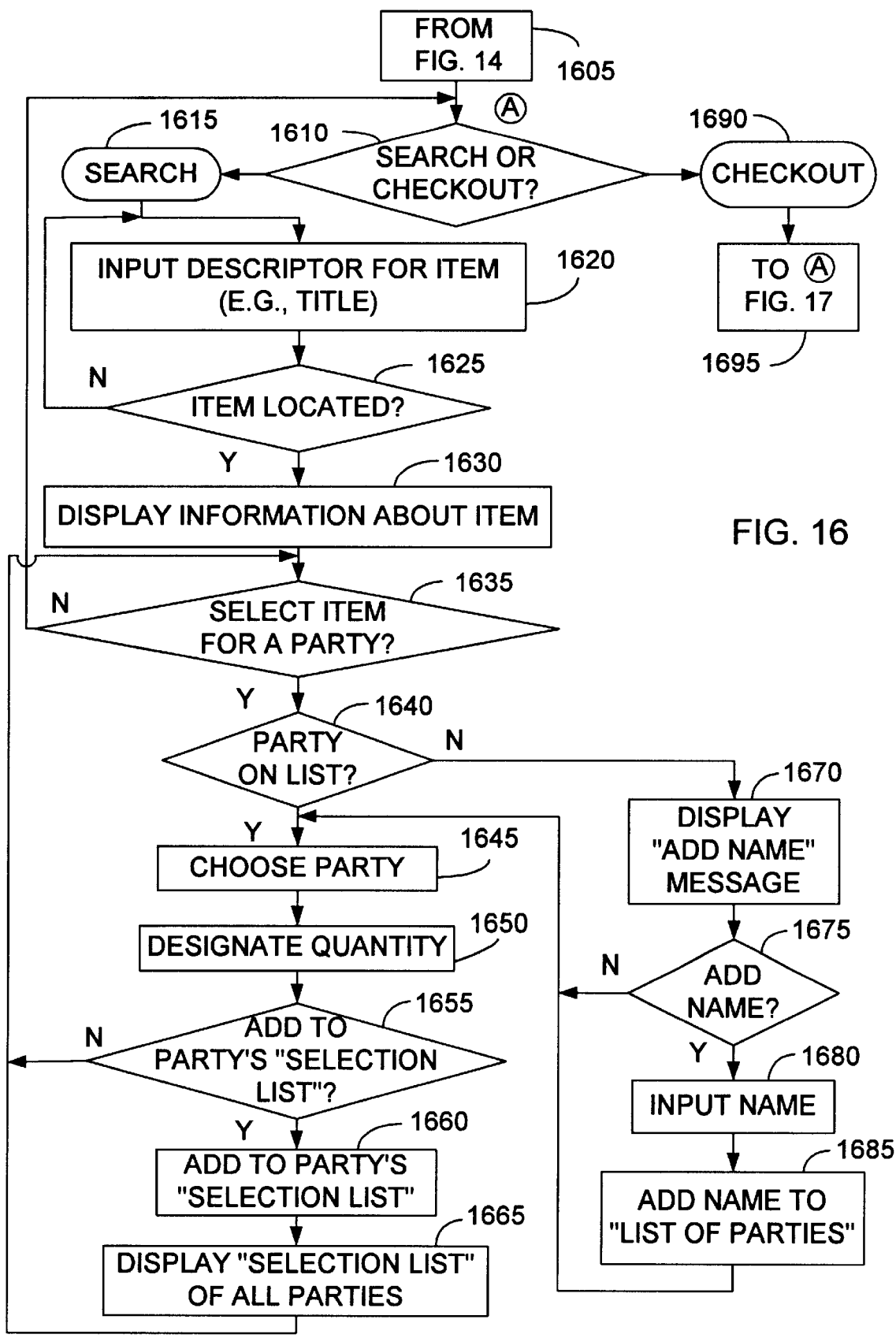

Now reference is made to FIG. 16, which is associated with FIG. 14 (block 1605) via point A of FIG. 16. The first processing step of FIG. 16 is a decision, via block 1610, to determine if a "search" (reference point 1615) for an item is desired, or if "checkout" (reference point 1690) is desired. Assuming that a search is to occur, the purchaser inputs a descriptor for the item, as evidence by processing block 1620. If the item is not located, as determined via decision block 1625, then a new search is started. If the item is located, processing block 1630 is executed to display information about the item. Once the item is located, the purchaser may decide to select the item for a party, as carried out by decision block 1635. If the item is not associated with any party, a new search may commence. If the item is to be associated with a party, then decision block 1640 is entered to determine if the party is already on the "list of parties". The processing of effected by blocks 1640, 1645, 1650, 1655, 1660, 1665, 1670, 1675, 1680, and 1685 are essentially the same as blocks 1530, 1535, 1540, 1545, 1546, 1550, 1560, 1565, 1570, and 1575, respectively, of FIG. 15 and need not be repeated here. In FIG. 16, the output of processing block 1665 returns to decision block 1635.

Figure 17:
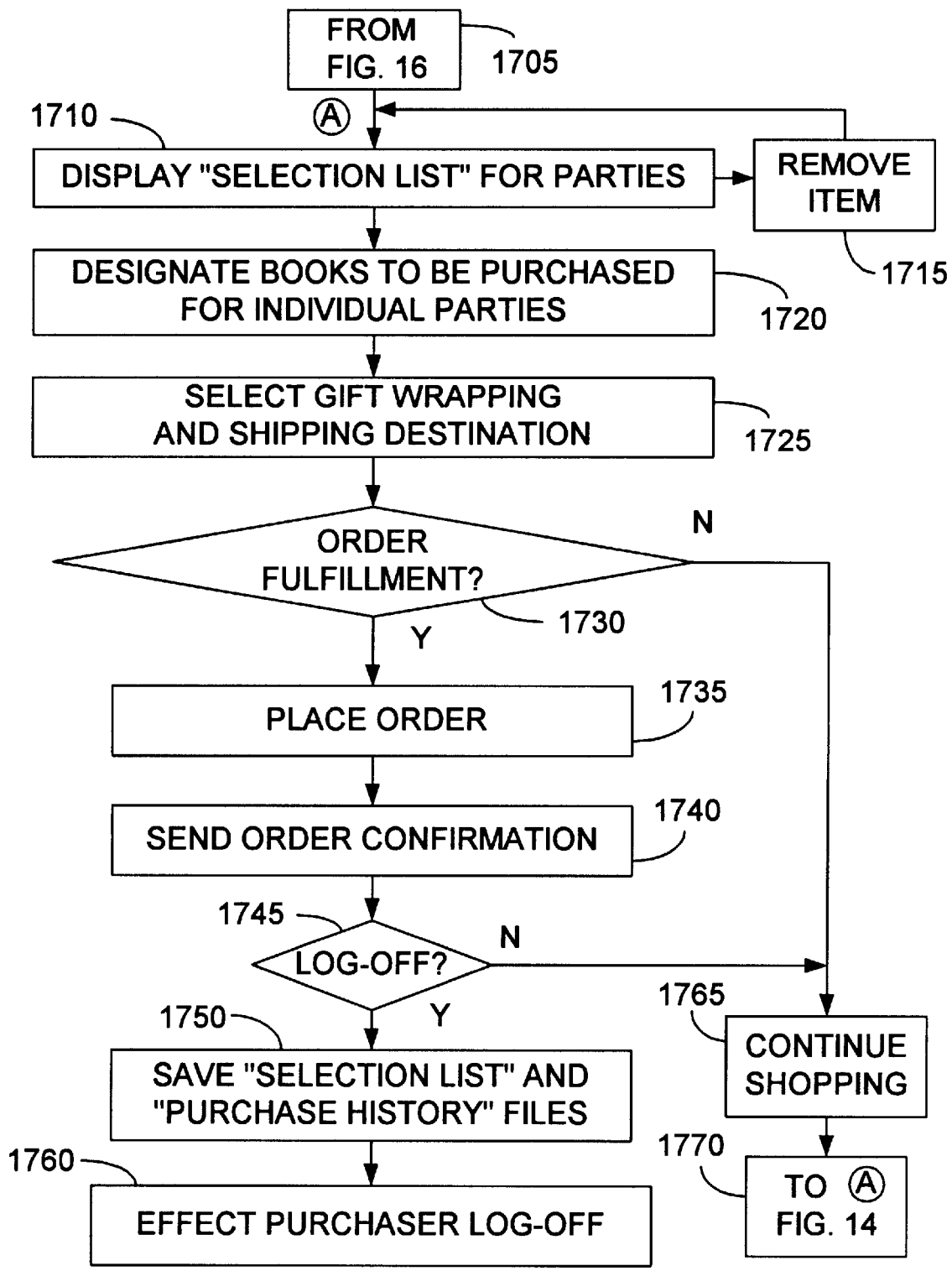

If "checkout" is desired, as determined by decision block 1610, then processing is transferred to point A of FIG. 17, as depicted by block 1695 of FIG. 16.

Now reference is made to FIG. 17, which is associated with FIG. 16 (block 1705) via point A of FIG. 17. Upon "checkout", as per processing block 1710, the "selection list" for all parties is displayed. It is possible (processing block 1715) to remove an item(s) at this time. Next, once the list is satisfactory to the purchaser, then it is possible to designate particular books to be purchased for individual parties on the "list of parties" (processing block 1720). Then, as per processing block 1725, the purchaser indicates if gift wrapping is desired, and chooses a shipping destination. If order fulfillment is not yet desired, as determined from processing block 1730, it is possible to return to point A of FIG. 14 to continue shopping (processing blocks 1765 and 1770 depict this activity).

If order fulfillment is desired, then the order is placed via processing block 1735. Once the order is accepted, then the purchaser is sent a confirmation of the order (e.g., by e-mail) as evidenced by processing block 1740. The purchaser, via decision block 1745, can choose to log-off or continue shopping. If the purchaser continues, the processing returns to point A of FIG. 14.

If the purchaser logs-off, then the "selection list" and "purchase history"files are saved on the system (processing block 1750), and log-off is effected (processing block 1760).

Actions Invoked by Clicking on Buttons 103–107

Figure 18:
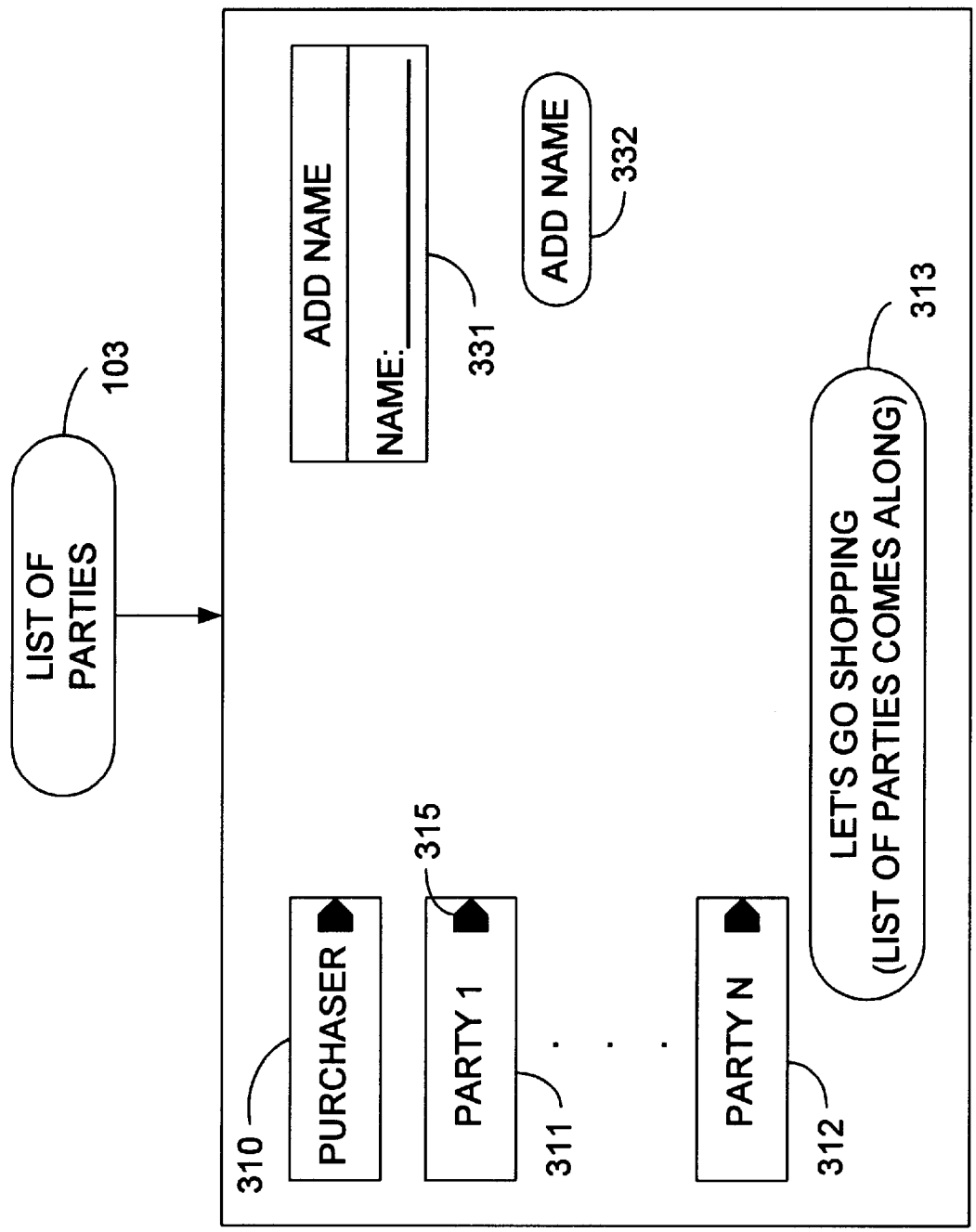
FIGS. 18–22 depict flow diagrams of processes invoked by, respectively, the 'List of Parties' button, the 'Shopping List' button, the 'Back' button, the 'Checkout' button, and the 'Log Out' button of FIG. 1.

With reference to FIG. 18, there is shown the screen displayed by clicking on button 103 depicted, for example, in FIG. 1. This screen is the variable-display region of FIG. 3.

Figure 19:
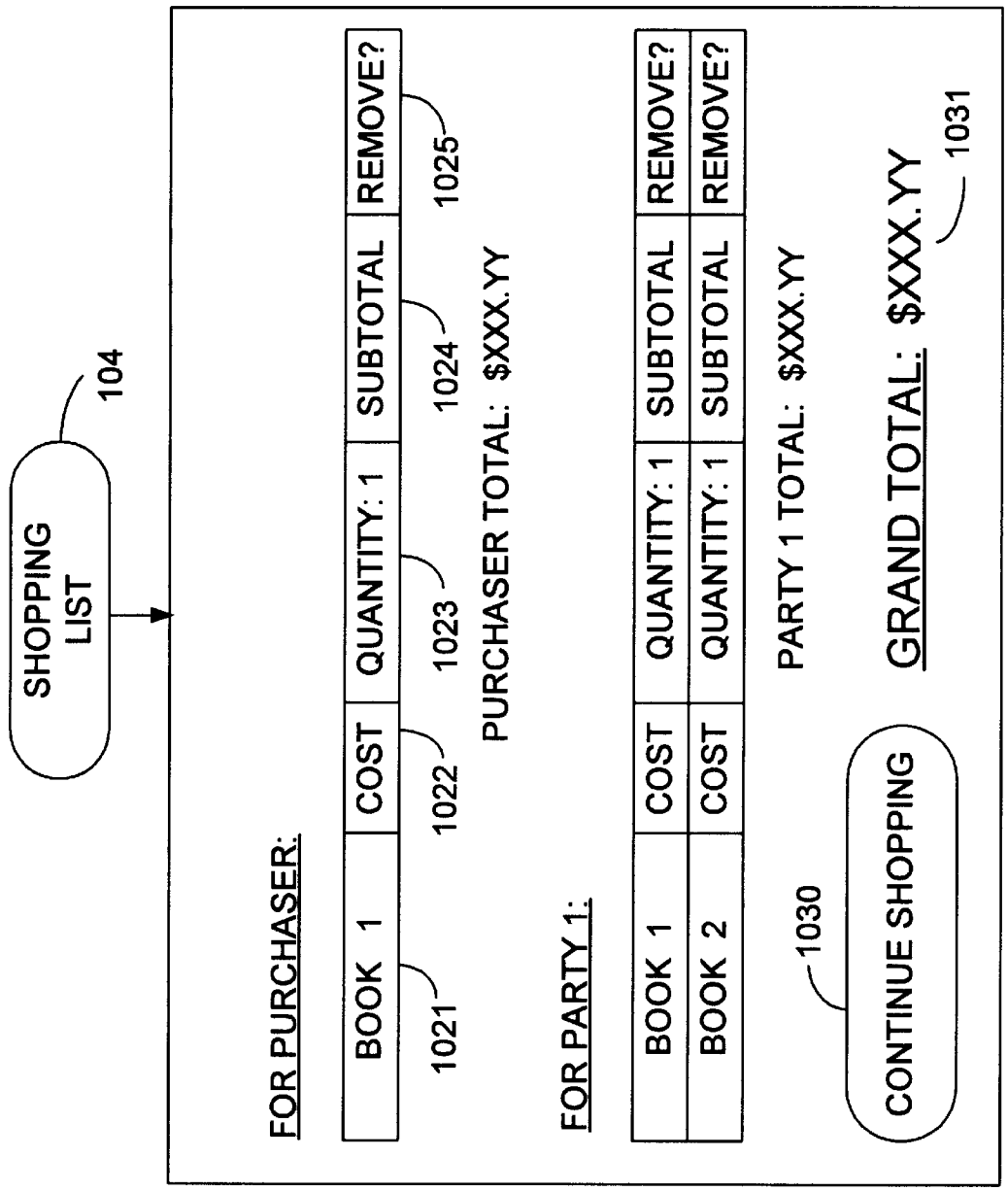

With reference to FIG. 19, there is shown the screen displayed by clicking on button 104 depicted, for example, in FIG. 1. This screen is the variable-display region of FIG. 10.

Figure 20:
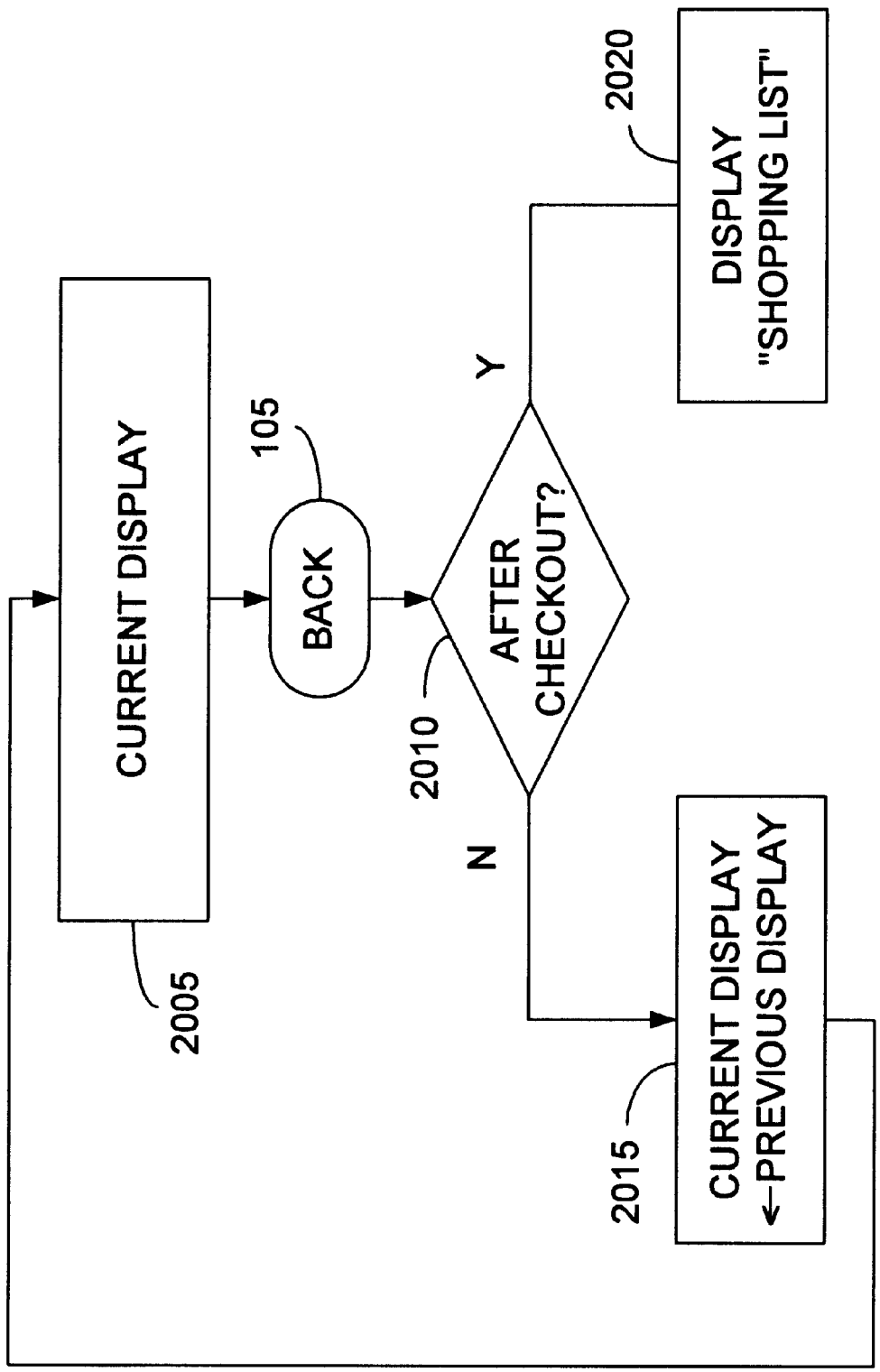

With reference to FIG. 20, there is shown the activity effected by clicking on button 105 depicted, for example, in FIG. 1. It is necessary to distinguish the processing effected when button 105 is clicked, and this processing is dependent upon whether (decision block 2010) checkout (i.e., order fulfillment) has been completed or not. As is normally expected, the 'Back' button returns to the previous display, that is, the new current display (block 2005) becomes the previous display (block 2015). On the other hand, once an order has been fulfilled, it is not feasible to display the prior screen since it would appear to the purchaser that the order has not been processed, when in fact it has been completed. Thus, to preclude this situation, the "shopping list" is displayed (block 2020), which now includes the purchase history plus any selected, but not yet purchased, items.

Figure 21:
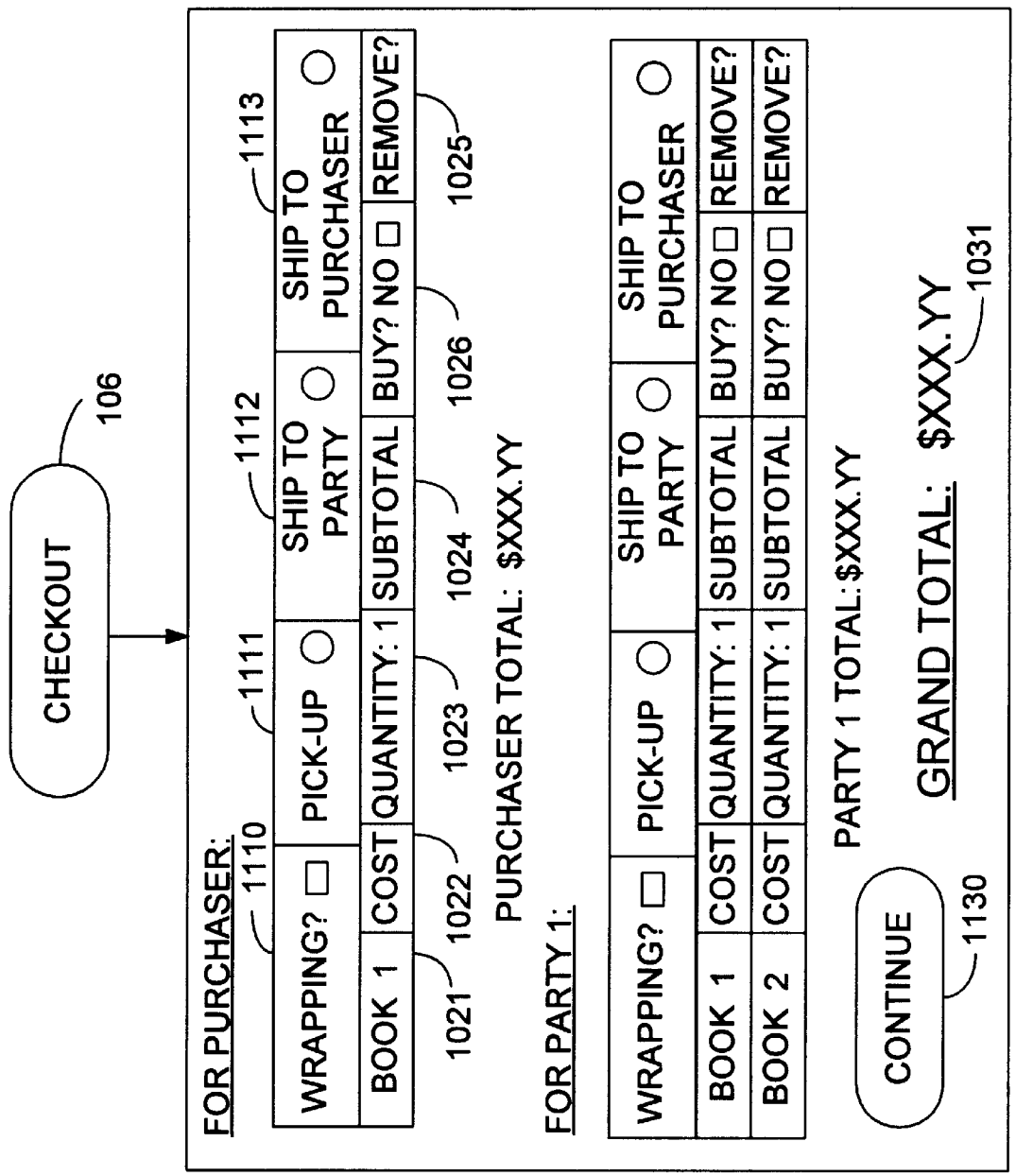

With reference to FIG. 21, there is shown the screen displayed by clicking on button 106 depicted, for example, in FIG. 1. This screen is the variable-display region of FIG. 11.

Figure 22:
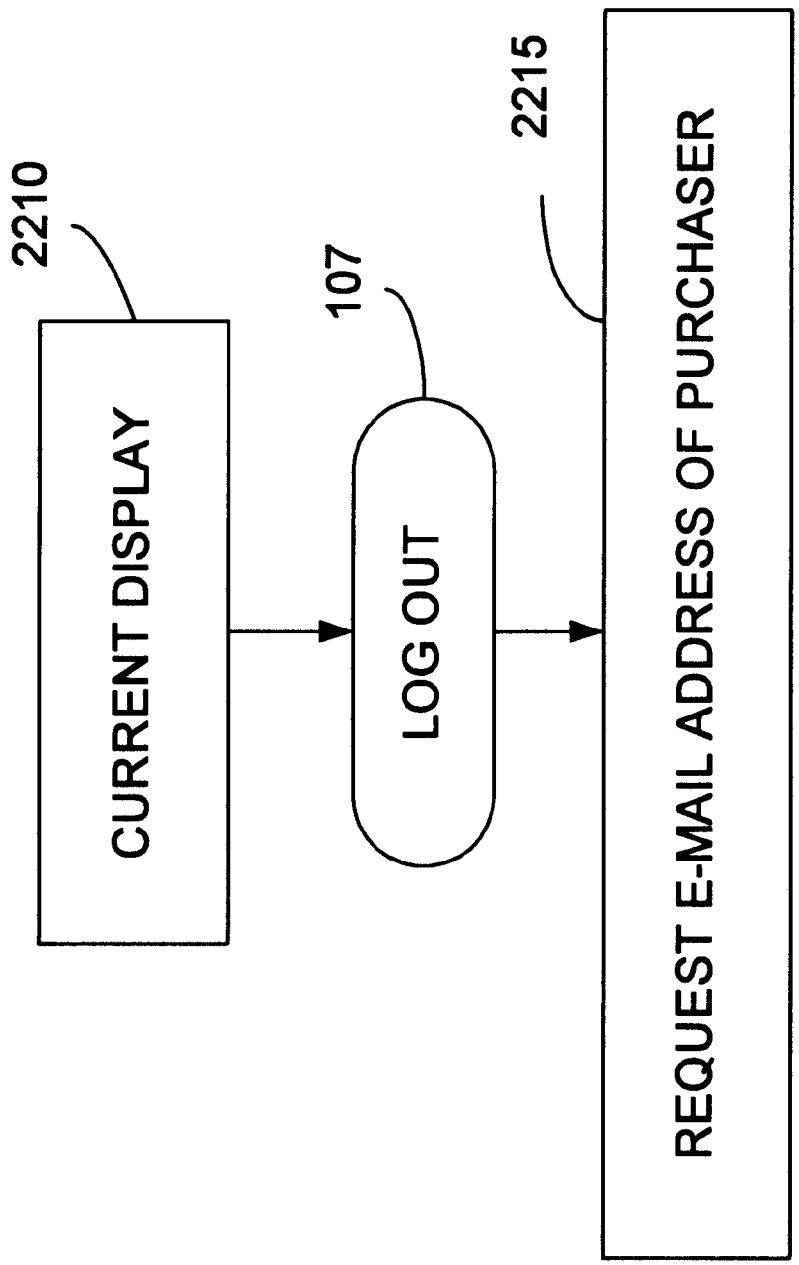

With reference to FIG. 22, there is shown the screen displayed by clicking on button 107 depicted, for example, in FIG. 1. This button transitions the screen display from the current display (block 2210) to the screen display requesting the purchaser input his/her e-mail address, to thereby re-start a shopping experience.

It is instructive to highlight at this point, now that the general methodology has been described, the points-of-departure over the prior art. First, the technique allows the shopper to build a list of names that the shopper takes with him/her as the shopper makes selections of items to purchase. Second, with the technique, the selections are kept track of by name. Third, if interrupted for any reason, the status of selections by name is not lost. Moreover, the status is continually updated and available (even if interrupted) by logging-in anytime—whether immediately, or even after a few hours, days, or weeks. Fourth, it is not necessary for the shopper to plan or know before the shopping session the number of items desired for each party—the technique is dynamic in that such decisions can be made as the shopping session unfolds. Fifth, it is also possible to add names to the name list ("list of parties") dynamically, especially at the time an item is selected—in effect, the technique provides the capability to generate a name list by-person, by-item (in a manner similar to a compilation on a sheet of paper), but now the computational capabilities of the system greatly enhance the buying experience. Sixth, whenever (e.g., today, tomorrow, next week) the shopper is ready to purchase items, whether selected items or all items for selected parties or all parties, the selection list of potential purchases is converted into a real purchase list. Seventh, the shopper can: use the last inputted shipping information; input new shipping information for each party receiving an order; or as an alternative, mark the item for pick-up at a local store for Web sites with "brick-and-mortar" stores. The actual purchases are maintained in the system database, along with selections not purchased, on a per-party basis. Eighth, the technique can be use on the Web remotely, but it is also practical in an "in-store" environment to keep track of selections and purchase history for each party on the name list. Ninth, the purchase history is available, by individual name, in the future so the shopper has a record of past purchases for as long as the shopper desires to keep such a record. Tenth, this technique is a tremendous aid to shoppers with children/grandchildren, business buyers, or any multiple-party purchaser, to keep a long-lasting record of purchase by-name, by-item. Together with the pending purchases on the selection list and the actual purchases, the shopper has use of a technique that captures the best aspects of the "in-store" buying process for multiple parties, but augments the process by providing an everlasting record.

System Hardware of An Illustrative Embodiment

Figure 23:
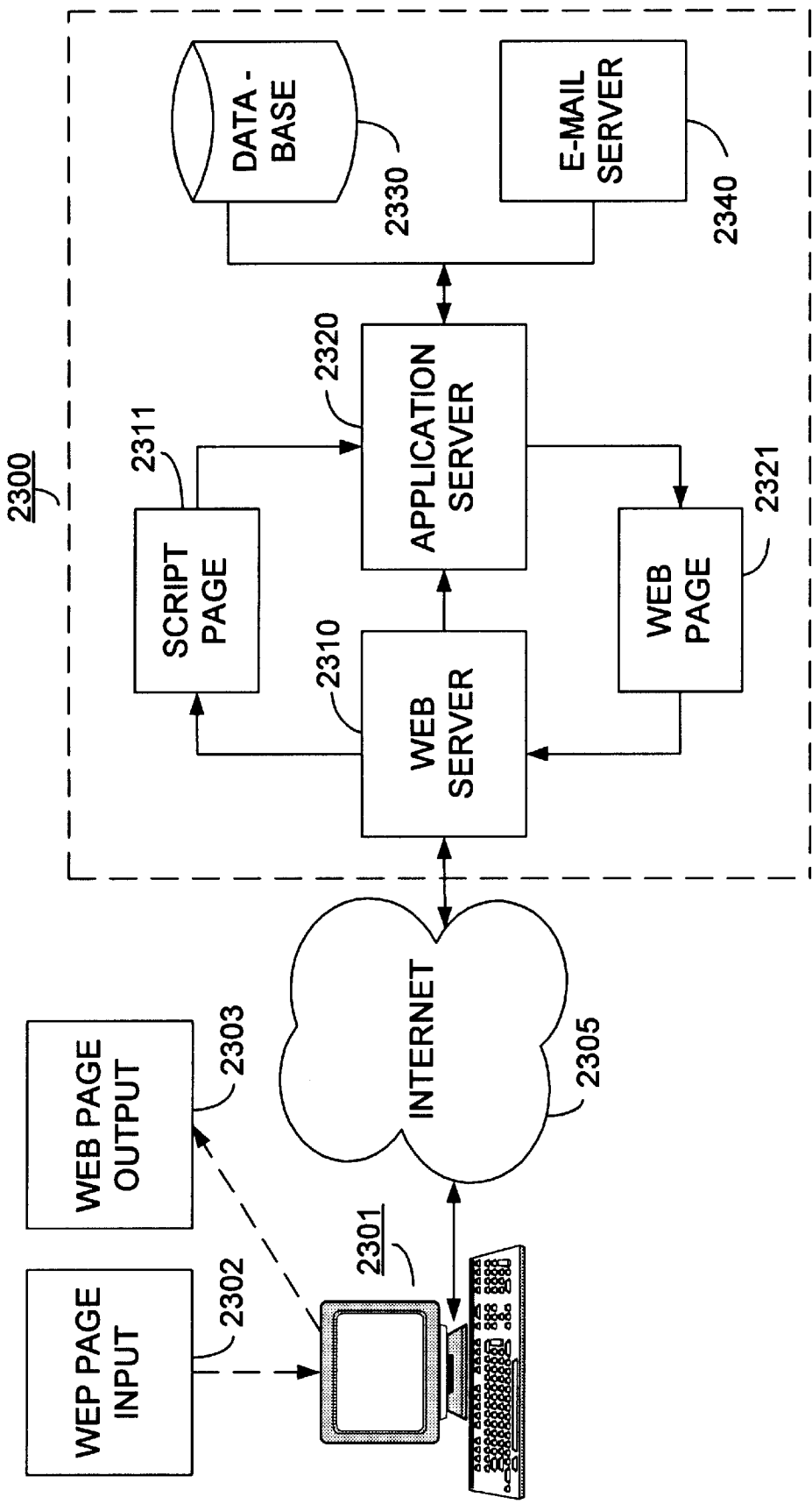
FIG. 23 is a high-level block diagram of hardware components for an illustrative embodiment of the present invention.

With reference to FIG. 23, there is shown high-level block diagram 2300 of hardware components which comprise an illustrative embodiment of the system in accordance with the present invention. In particular, the components of system 2300 include: (a) Web server 2310; (b) application server 2320; (c) database 2330; and (d) e-mail server 2340. System 2300 is coupled to conventional Internet network or "cloud"2305. Moreover, access to Internet 2305 is via PC 2301.

Figure 24:
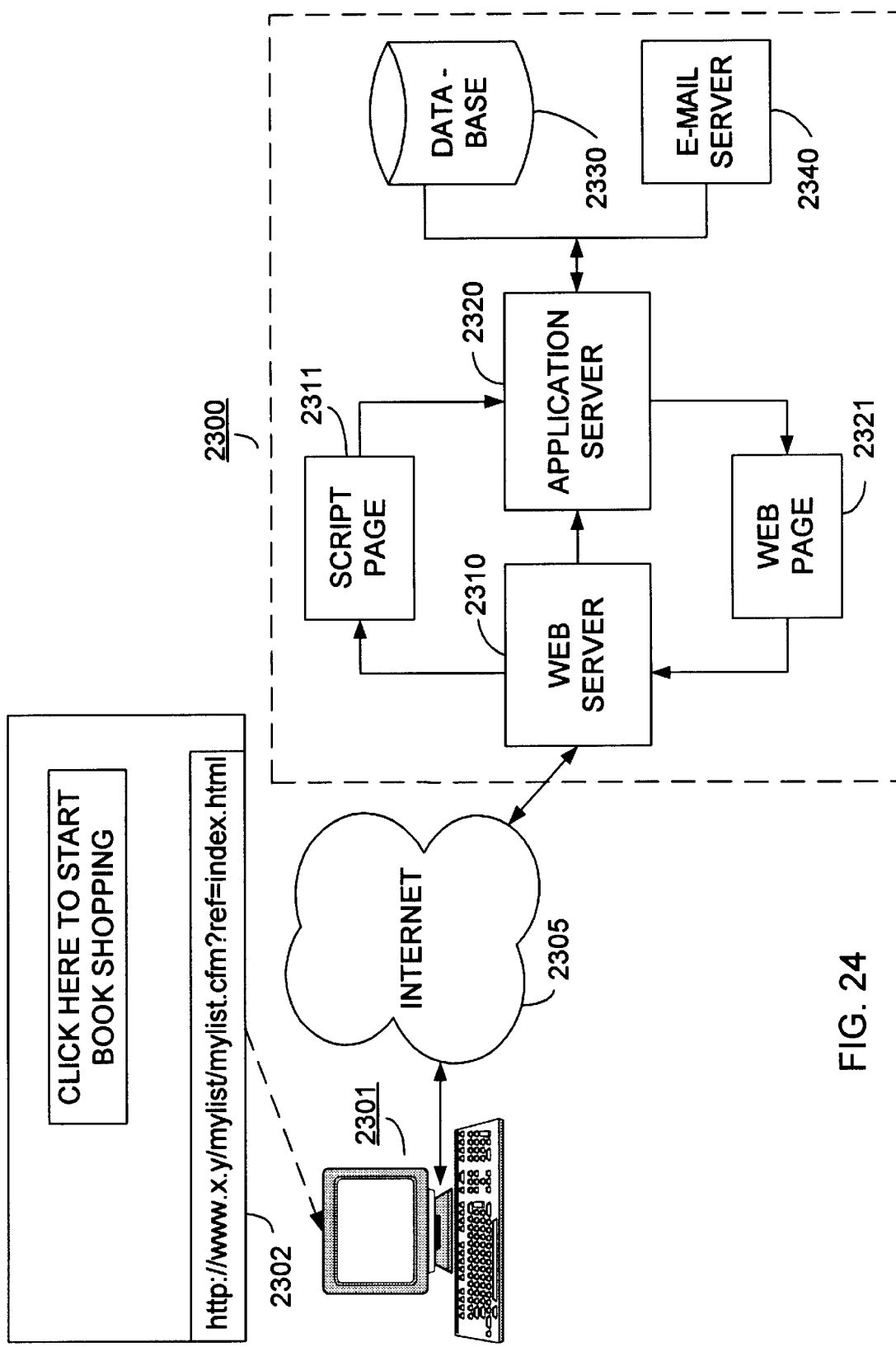
FIG. 24 depicts an exemplary input Web page which invokes processing by the system of FIG. 23 to interpret an input script file.

In operation, upon log-in and during various stages of the request-response interaction with system 2300, the user is presented with a Web page in HTML format on the display of PC 2301—depicted as Web page 2302 which conveys user input to system 2300, and as Web page 2303 which conveys a system response to the user. When a user requests information from system 2300 such as by typing and/or clicking on links on input Web page 2302, the request for information is transmitted using the "http" protocol to system 2300. For example, with reference to FIG. 24, suppose the user first points to the portion of input Web page 2302 having the "CLICK HERE TO START BOOK SHOPPING" message; correspondingly, the request line at the bottom of page 2302 (http://www.x.y/mylist/mylist.cfm?ref=index.html) indicates to the user which URL will be accessed once the user clicks on the "CLICK HERE" message portion of Web page 2302. In effect, the user requests system responses in the usual manner by pointing and clicking on HTML Web pages.

Web server 2310 recognizes that a script file is requested because of the ".cfm" file extension on the transmitted link "www.x.y/mylist/mylist.cfm . . . ". Then, instead of merely sending the requested script file to the user as the conventional response, Web server 2310 intervenes and passes the script file (illustrated pictorially by script page 2311) to application server 2320. Illustratively, application server 2310 is configured with the Cold Fusion 4.01 server software available from the Allaire Corporation ("www.allaire.com"). Application server 2310 reads and implements the script language in the ".cfm" file. System 2300 uses Cold Fusion Markup Language (CFML) files residing on Web server 2310 to implement the illustrative embodiment. The various files resident on Web server 2310 carry out the methodology in accordance with the present invention, with a preferred embodiment being conveyed by FIGS. 14–17. An illustrative ".cfm" file is shown in the Appendix for the example above, namely, "www.x.y/mylist/mylist.cfm?ref=index.html".

The output of application server 2320 is a Web page, but in HTML format, shown pictorially as Web page 2321. The Web page is delivered, via Web server 2310 and Internet 2305, to PC 2301 as response Web page 2303.

In order for application server 2320 to compile the response Web page 2321, server 2320 communicates with database 2330 (via, for example, Microsoft's Access using the Open Database Connectivity (ODB) set of routines).

E-mail server 2350 is arranged to return an e-mail confirmation message to the buyer once an order has been completed; the message contains information such as books ordered, shipping address(es), "billed to" name, and so forth.

Generalizations to the System

For purposes of specificity, but not by way of limitation, system 2300 is illustrated as operating in the Internet environment with only a single server, and initially elucidates the set of services embodied in the book-purchase experience. However, it is equally clear that a general computer network implementation imbued with the structure and characteristics heretofore described can effect the applications in accordance with the present invention. For instance, the book-purchase experience can be implemented locally as well, that is, the client-server may be interconnected, for example, via a local area network (LAN) which is not coupled to the Internet. All of the aforementioned benefits apply to this local system so as to realize a multiple-person buying information system for enhancing an "in-store" shopping experience.

Moreover, server-side TCP/IP and HTTP enabled application environment could be substituted for Cold Fusion and the Cold Fusion script files (".cfm") that comprise the illustrative implementation. Examples include Microsoft's ASP, PHP, Java, Perl, and C++.

In addition, it is possible to differentiate the activity of "logging-off" the Web site that provides the inventive service from temporarily leaving the Web site. In the former case, implicitly the purchaser desires to leave the Web site for duration of the current on-line session. This is in contrast to the latter case of leaving the Web site temporarily, such as might occur for example, when a purchaser visits the home page of another Web site, and then intends to return to the Web site of the inventive service. In the latter case, to relieve the purchaser of the step of again "logging-in" via the purchaser's e-mail address, a so-called "cookie" may be used to immediately display to the purchaser the screen display of FIG. 3. A "cookie" is a small text file that is stored on the hard disk of the purchaser's PC. In this case, the purchaser's e-mail address may be stored in a "cookie" during upon log-on, and then referenced to return the purchaser to the inventive Web site from another Web site without the need to re-enter the e-mail address.

Finally, creating and managing name lists can be a completely local activity in the sense that a "selection list" can be compiled over time, especially for an occasion (birthdays and Christmas) and stored in the PC, that is, a selection list is compiled over a number of distinct log-on sessions onto the purchaser's PC by the purchaser, and the selection list then can be stored locally for later recall during a future log-on session. As the occasion nears, the purchaser can, for instance, print out the selection list and take the list to a local store to buy the items on the list, or fax the list to a store for completion of the order.

Although various embodiments which incorporate the teachings of the present invention have been shown and described in detail herein, those skilled in the art can readily devise many other varied embodiments that still incorporate these teachings.

| Glossary | |
|---|---|
| ACCESS | a database system developed by and available from the Microsoft Corporation |
| API | Application Programming Interface. A set of routines that an application uses to request and complete lower-level services |
| CFML | Cold Fusion Markup Language. A scripting language that is interpreted by Cold Fusion (below) |
| Client/Server | a database access strategy in which one or more client's (e.g., computer terminals) access data through a server of the clients. The clients usually implement the user interface which the server controls the database access |
| Cold Fusion | a "middleware" application that interfaces with Web servers to APIs or CGIs (Common Gateway Interface) and interprets a requested Web page written in Cold Fusion scripting language |
| HTML | Hypertext Markup Language. HTML is the markup language used to structure a format text files to create Web pages. HTML provides a standard format for information on the Web |
| HTTP | Hypertext Transfer Protocol. HTTP is the backbone of the Web, and is used by browsers to request information from Web servers and by servers to return that information |
| JavaScript | a predominantly client-side browser-interpreted) scripting language |
| ODBC | Open Database Connectivity. A specification for an API that defines a standard set of routines with which an application can access data in a data source |
| TCP/IP | Transmission Control Protocol/Internet Protocol are the two communication and addressing protocols that engender the Web |
| Web Page | a Web page is typically a single HTML file, viewable through a Web browser |
| Web Site | a Web site is a collection of Web pages, usually organized to provide navigation connecting the multiple pages |
| Web | short for World Wide Web (WWW). The WWW is composed of millions of Web pages, usually written in HTML and accessible from each other through hypertext links. |

Appendix

```
<cfinclude template="signup/Authenticate.cfm">
<CFIF session.UserLogged eq "YeX">
<CFSET session.thisPage = "/myList/myList.cfm">
<cfquery name="getListNames" DATASOURCE="#DSN#">
            Select*
            From MyNameList
            Where OwnerID = '#Session.sUserID#'
</cfquery>
<html>
<head>
<title>My Shopping List</title>
<STYLE>
<!--
a:hover {
    color : Red;
}
-->
</STYLE>
<script language="JavaScript">
function goGetIt(option X)
{
    //alert(optionX);
    if (optionX.indexOf("RMV",0) > 0)
        {
        var response = confirm("Are you sure you want to remove it?");
            if (response){
                location.href=optionX;
                }
            else{
                // reloading the page to refresh the form
                location.href="myList.cfm"
                }
        }
    else
        {
            location.href=optionX;
        }
}
</script>
<!-- Dianes Shared Javascript -->
<script language="JavaScript" src="/include/js/shared.js"></script>
</head>
<BODY onLoad="javascript:document.thisForm.reset()" BGCOLOR="#FFFFFF"
BACKGROUND="/images/nolinebkg.gif" LEFTMARGIN=0 TOPMARGIN=0 MARGINWIDTH="0"
MARGINHEIGHT="0" LINK="#336633" VLINK="#336633">
<table width="734" border="0" cellspacing="0" cellpadding="0">
  <tr>
    <td><img src="/images/topinfo-01-01.gif" width="224" height="112" border="0"
usemap="#home"></td>
                        <td><img src="/images/topinfo-listsA.gif" width="174" height="112"></td>
                        <td><img src="/images/topinfo-listsB.gif" width="172" height="112"></td>
                        <td><img src="/images(topinfo-01-04.gif" width="180" height="112" border="0"
                        usemap="#giftnavmap"></td>
                          </tr>
                        </table>
                        <table width="734" border="0" cellspacing="0" cellpadding="0">
                          <tr>
    TD WIDTH="100"> </TD>
        <TD WIDTH="533" COLSPAN="2"><cfinclude
template="../search/searchbar.cfm"></TD>
        <TD WIDTH="80" ALIGN="RIGHT" VALIGN="TOP">
    <cfoutput><cfif ref is "index.html"><a href="http://#server#" target="_top"><cfelseif ref is
"ListDetail.cfm"><a href="MyList.cfm?ref=#session.thisPage#&LID=#session.LID#"><cfelse><a
href="#ref#?ref=#session.thisPage#"></cfif></cfoutput><IMG SRC="/images/backbutton.gif"
width=72 height=16 border=0 alt=""></a></td>
  </tr>
</table>
<table width="734" border="0" cellspacing="0" cellpadding="0">
  <tr>
    <td valign="top" width="100"><cfoutput>
            <img src="/images/left-navigation/left-navigation-top.gif" width=87
height=16 border=0 alt="navigation"><br>
            <A HREF="/myList/myList.cfm?ref=#session.thisPage#" target="_self"
onMouseover="display('list', '0'); return true" onMouseout="display('list', '10'); return true"><img
src="/images/left-navigation/left-navigation-list.gif" width=87 height=22 border=0 name="list" alt="my
shopping list"></a><br>
            <a
```

-continued

Appendix

```
HREF="/dianespicks/holidaycatalog/catalog_holiday1.cfm?ref=#session.thisPage#" target="_self"
onMouseover="display('holiday', '1'); return true" onMouseout="display('holiday', '11'); return
true"><img src="/images(left-navigation/left-navigation-holiday.gif" width=87 height=23 border=0
name="holiday" alt="holiday catalog"></a><br>
          <A HREF="/dianespicks/index.cfm?ref=#session.thisPage#" target="_self"
onMouseover="display('picks', '2'); return true"onMouseout="display('picks', '12'); return true"><img
src="/images(left-navigation/left-navigation-picks.gif" width=87 height=22 border=0 name="picks"
alt="diane's picks"></a><br>
          <A HREF="/angeltree/angeltree.cfm?ref=#session.thisPage#" target="self"
onMouseover="display('angeltree', '3'); return true" onMouseout="display('angeltree', '13'); return
true"><img src="/images/left-navigation/left-navigation-angeltree.gif" width=87 height=22 border=0
name="angeltree" alt="diane's angel tree"></a><br>
          <A HREF="/note/note.cfm?ref=#session.thisPage#" target="_self"
onMouseover="display('note', '4'); return true" onMouseout="display('note', '14'); return true"><img
src="/images/left-navigation/left-navigation-note.gif" width=87 height=24 border=0 name="note" alt="a
note from diane"></a><br>
          <a HREF="/aboutus/aboutus.cfm?ref=πsession.thisPage#" target="_self"
onMouseover"display('about', '5'); return true" onMouseout="display('about', '15'); return true"><img
src="/images/left-navigation(left-navigation-about.gif" width=87 height=22 border=0 name="about"
alt="about us"></a><br>
          <img src="/images/left-navigation/left-navigation-bottom.gif" width=87
height=10 border=0 alt=""><br>
          a HREF="/giftwagon/giftwagon.cfm?ref=#session.thisPage#"
target="_self"><img src="/images/left-navigation/left-navigation-giftcerts.gif" width=87 height=55
border=0 alt="Gift Certificates"><br>
    <img src="images/need_help2.gif" width=85 height=69 border=0 alt="Need Help? Call 203-
869-1515."></cfoutput></td>
  <td width="634" valign="TOP">
<p><br>
<table border=0 cellpadding=0 cellspacing=0 width=634>
<tr>
<!--- Names in shopping list --->
<td valign="top">
<font face="Arial, Helvetica, sans-serif" size="2" color="Red">
<cfoutput><b><i>#session.sUserID#</font></i></b><br><br></cfoutput>
<font face="Arial, Helvetica, sans-serif" size="2">
<CFIF getListNames.RecordCount IS NOT 0>
<b>You have <cfoutput><font
color="##FFF0000">#getListNames.RecordCount#</font></cfoutput><CFIF getListNames.RecordCount
GT 1></CFIF> names in your shopping list: </b>
<p>
<table border="0" cellspacing="2" cellpadding="4" bgcolor="#FFFFDD">
        <tr>
          <TD bgcolor="#005E00"><font face="Arial, Helvetica, sans-serif" size="2"
color="#FFFFFF"><b>#</b></font></TD>
          <TD bgcolor="005E00"><font face="Arial, Helvetica, sans-serif" size="2"
color="FFFFFF"><b>Name</b></font></TD>
          <TD colspan=4 bgcolor="#005E00"> </TD>
        </TR>
    <CFSET thisForm = 1>
        <form name="thisForm">
    <CFOUTPUT QUERY="getListNames">
        <tr>
          <TD><font size="3" style="font-size:
11pt;"><b>#CurrentRow#</b></font><TD>
          <TD><font face="Arial, Helvetica, sans-serif"
size="2">#Name#</FONT></TD>
          <td valign="top">
          <select name="LID#thisForm#"
onChange="goGetIt(document.thisForm.LID#thisForm#.options[document.thisForm.LID#thisForm#.sel
ectedIndex].value)">
          <option value="##" SELECTED>Choose an option
          <option
value="ListDetail.cfm?LID=#NameListID#&ref=#session.thisPage#">View Detail
          <option
value="shipping_info.cfm?LID=#NameListID#&ref=#session.thisPage#">Edit Shipping Info
          <cfif Name is not 'Myself'> <option
value="ListRemove.cfm?LID=#NameListID#&ref=session.thisPage#&RMV">Remove Name </cfif>
          </select>
          </td>
          <CFSET thisForm = thisForm + 1>
        </CFOUTPUT>
        </form>
    </TABLE>
        <CFELSE>
    <b>Your shopping list is empty.</b>
```

-continued

Appendix

```
</CFIF>
<p>
<cfoutput>
<table cellspacing"0" cellpadding="0" align="center">
<tr>
<td align="center">
<a href="/dianespicks/index.cfm?ref=#session.thisPage #"><img src="../images/letsgoshopping.gif"
width=144 height=24 border=0 alt="Let's go shopping... "></a><td>
</tr><tr>
<td align="center">
<font face="Arial, Helvetica, sans-serif" size=1">
The list comes with you.</font>
</td></tr></table>
</cfoutput>
</td>
<!--- Add names to list --->
<td align="center" valign="top">
<p>
<table width="250" border="1" cellspacing="0" cellpadding="4" bordercolor="#669966">
<tr><td><FONT SIZE="2" FACE="Arial, Helvetica, sans-serif" COLOR="#005E00">
<b>
<i><font size="2" color="#005E00">Your selections are never lost.</font><p>Even if you are
interrupted or want to leave for a while during shopping, you can return to the site and complete your
selections.<p>
Your purchases are also maintained for future reference.</b></i>
</font></td>
</tr></table>
<p>
<font face="Arial, Helvetica, sans-serif" size="2">
<b>Add names to your shopping list:</b>
<p>
        <cfoutput><FORM ACTION="myNameList.cfm?ref=#session.thisPage#"
METHOD="post"> </cfoutput>
                TABLE CELLSPACING="2" CELLPADDING="2" bgcolor="#005E00">
                    <TR>
                        <TD><FONT FACE="Arial" SIZE="-1"
COLOR="White"><B>Name</FONT></B></FONT></TD> <TD><INPUT TYPE="text"
NAME="NAME1" VALUE=""<></TD>
                    <TR>
                     <TR>
                        <TD><FONT FACE="Arial" SIZE="-1"
COLOR="White"><B>Name</FONT></B></FONT></TD><TD><INPUT TYPE="TEXT"
NAME="NAME2"VALUE=""></TD>
                    </TR>
                     <TE>
                        <TD><FONT FACE="Arial" SIZE="-1"
COLOR="White"><B>Name</FONT></B></FONT></TD> <TD><INPUT TYPE="TEXT"
NAME="NAME3" VALUE=""></TD>
                    </TR>
                     <TR>
                        <TD><FONT FACE="Arial" SIZE="-1'"
COLOR="White"><B>Name</FONT></B></FONT></TD> <TD><INPUT TYPE="TEXT"
NAME="NAME4" VALUE=""></TD>
                    </TR>
                     <TR>
                        <TD><FONT FACE="Arial" SIZE="-1"
COLOR="White"><B>Name</FONT></B></FONT></TD> <TD><INPUT TYPE="TEXT"
NAME="NAME5" VALUE=""></TD>
                    </TR>
                     <TR>
                        <TD><FONT FACE="Arial" SIZE="-1"
COLOR="White"><B>Name</FONT></B></FONT></TD> <TD><INPUT TYPE="TEXT"
NAME="NAME6" VALUE=""><TD>
                    </TR>
                </TABLE><BR>
                <div align=right><INPUT TYPE="SUBMIT" NAME="addNames"
VALUE="Add names"><div>
                </FORM>
</td>
</tr></table>
<p>
            <cfinclude template="footerlinks.cfm">
</td>
 </tr>
</table>
<br>
<cfoutput>
```

-continued

Appendix

```
<map name="home">
  <area shape="rect" coords="3,3,215,40" href="http://#server#" target="_top" alt="home">
</map> <map name="giftnavmap">
<AREA SHAPE="rect" COORDS="15,70,146,83"
HREF="#protocol##server#/checkout/selectcheckout.cfm
?checkout=&ref=#session.thisPage#" ALT="checkout">
  <area shape="rect" coords="5,50,155,62"
href="#protocol##server#/shoppingCart/shopping_bag.cfm?ref=#session.thisPage#" alt="shopping
bag">
</map>
</cfoutput>
</body>
<html>
<CFELSE>
     <CFLOCATION URL ="signup/index.cfm" ADDTOKEN="NO">
</CFIF>
```

What is claimed is:

1. A method for merchandising items from a list of items stored in a computer system to a customer communicating with the computer system, the method comprising the steps of inputting by the customer a list of names for whom the customer may associate items, automatically saving the name list in the computer system as the name list is inputted, searching for an item from the list of items by the customer to produce a selected item, associating by the customer the selected item with a set of names on the name list to generate a selection list, automatically saving the selection list in the computer system, submitting by the customer an order request to the computer system to purchase the selected item for the set of names, and automatically saving in the computer system, upon fulfillment of the order request, a purchase history file for each name in the set of names having a corresponding purchased item.

2. A method for merchandising items from a list of items stored in a computer system to a customer communicating with the computer system, the method comprising the steps of inputting by the customer a list of names for whom the customer may associate items, automatically saving the name list in the computer system as the name list is inputted, searching for an item from the list of items by the customer to produce a selected item, associating by the customer the selected item with a set of names on the name list to generate a selection list, automatically saving the selection list in the computer system, searching for another item from the list- of items by the customer to produce another selected item, associating, by the customer, said another selected item with another set of names on the name list to generate an augmented selection list, automatically saving the augmented selection list in the computer system, submitting by the customer an order request to the computer system to purchase the selected item or said another selected item or both from the augmented selection list in correspondence to the sets of names, and automatically saving in the computer system, upon fulfillment of the order request, a purchase history file for each name in the sets of names having a corresponding purchased item.

3. The method as recited in claim 2 wherein the step of saving a purchase history file includes the steps of removing the corresponding purchased item from the augmented selection list, and automatically re-saving the augmented selection list for later recall by the customer.

4. A method for merchandising items from a list of items stored in a computer system to a customer communicating with the computer system, the method comprising the steps of inputting by the customer a list of names for whom the customer may associate items, automatically saving the name list in the computer system as the name list is inputted, iteratively searching the list of items by the customer to produce an iteratively selected item, associating by the customer each iteratively selected item with a set of names on the name list to generate a selection list, automatically saving the selection list in the computer system, submitting by the customer an order request to the computer system to purchase each iteratively selected item for the corresponding set of names, and automatically saving in the computer system, upon fulfillment of the order request, a purchase history file for each name in the set of names having a corresponding purchased item.

5. The method as recited in claim 4 wherein the step of saving a purchase history file includes the steps of removing the corresponding purchased item from the selection list, and automatically re-saving the selection list for later recall by the customer.

6. A method for on-line merchandising of items to a customer over the Internet during a current on-line session, a list of items being stored remotely on an Internet server, the method comprising the steps of inputting by the customer a list of parties for whom the customer may associate items, automatically saving the list of parties on the server as the list of parties is inputted, searching for an item from the list of items by the customer to produce a selected item, associating, by the customer, the selected item with at least one of the parties on the list to create a selection list, automatically saving the selection list on the Internet server for later recall by the customer, recalling the selection list whenever the customer initiates a new Internet session, and purchasing at least one selected item in the selection list by the customer.

7. A method for on-line merchandising of items to a customer over the Internet during a current on-line session, a list of items being stored remotely on an Internet server, the method comprising the steps of inputting by the customer a list of parties for whom the customer may associate items, automatically saving the list of parties on the server as the list of parties is inputted, searching for an item from the list of items by the customer to produce a selected item, associating, by the customer, the selected item with at least one of the parties on the list to create a selection list, automatically saving the selection list on the Internet server for later recall by the customer, recalling the selection list and the list of parties whenever the customer initiates a new Internet session, deleting a name from the list of parties, including any of the items associated with the deleted party in the selection list, and automatically re-saving the list of parties and the selection list for later recall by the customer.

8. A method for on-line merchandising of items to a customer over the Internet during a current on-line session, a list of items being stored remotely on an Internet server, the method comprising the steps of inputting by the customer a list of parties for whom the customer may associate items, automatically saving the list of parties on the server as the list of parties is inputted, searching for an item from the list of items by the customer to produce a selected item, associating, by the customer, the selected item with at least one of the parties on the list to create a selection list, automatically saving the selection list on the Internet server for later recall by the customer, recalling the selection list and the list of parties whenever the customer initiates a new Internet session, searching for an additional one of the items by the customer to produce a selected additional item, associating by the customer the selected additional item with at least one of the parties to augment the selection list, and automatically re-saving the list of parties and saving the augmented selection list for later recall by the customer.

9. The method as recited in claim 8 further including the step, after the step of re-saving the list of parties and saving the augmented selection list, of submitting by the customer an order request to the Internet server to purchase items stored in the augmented selection list.

10. A method for on-line merchandising of items to a customer over the Internet during a current on-line session, a list of items being stored remotely on an Internet server, a list of parties generated during a prior log-on being stored on the Internet server, and a shopping list composed of a purchase history file and a selection list of un-purchased items, if any, for each of the parties being stored on the Internet server from a prior log-on, the method comprising the steps of displaying the list of parties to the customer, inputting by the customer a new party, if any, and automatically adding the new party to the list of parties upon input, displaying the shopping list upon request of the customer, searching for an item from the list of items by the customer to determine a selected item, associating by the customer the selected item with a set of parties on the list of parties to augment the selection list, if the customer chooses to purchase from the augmented selection list, submitting an order fulfillment request to the Internet server to purchase at least some of the items from the augmented selection list and saving on the Internet server each purchased item in the purchase history file and each un-purchased item in the augmented selection list for a later on-line session, and if the customer chooses to log-off without purchasing items from the augmented selection list, saving on the Internet server the augmented selection list for a later on-line session.

\* \* \* \* \*

UNITED STATES PATENT AND TRADEMARK OFFICE
CERTIFICATE OF CORRECTION

PATENT NO. : 6,473,738 B1
APPLICATION NO. : 09/533605
DATED : October 29, 2002
INVENTOR(S) : James Gordon Garrett Page 1 of 1

It is certified that error appears in the above-identified patent and that said Letters Patent is hereby corrected as shown below:

On the Title page, item (54), in "Title", in column 1, line 4, delete "MERCHANDIZING" and insert -- MERCHANDISING --, therefor.

On the Title page, item (57), under "ABSTRACT", in column 2, line 2, delete "merchandizing" and insert -- merchandising --, therefor.

In column 1, line 4, delete "MERCHANDIZING" and insert -- MERCHANDISING --, therefor.

Signed and Sealed this

Twenty-third Day of September, 2008

JON W. DUDAS
*Director of the United States Patent and Trademark Office*